United States Patent
Mutsuro et al.

(10) Patent No.: US 8,203,921 B2
(45) Date of Patent: Jun. 19, 2012

(54) RECORDING APPARATUS AND RECORDING METHOD

(75) Inventors: Yasuo Mutsuro, Yokohama (JP); Koichiro Nishimura, Yokohama (JP); Yutaka Nagai, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 12/832,182

(22) Filed: Jul. 8, 2010

(65) Prior Publication Data

US 2011/0158069 A1    Jun. 30, 2011

(51) Int. Cl.
*G11B 7/00* (2006.01)
(52) U.S. Cl. ...................... 369/47.53; 369/94
(58) Field of Classification Search .......... 369/47.51, 369/47.52, 47.53, 116, 47.1, 47.27, 47.5, 369/53.22, 94
See application file for complete search history.

(56) References Cited

U.S. PATENT DOCUMENTS

| 7,263,044 | B2 * | 8/2007 | Lee et al. | 369/47.53 |
| 7,274,638 | B2 * | 9/2007 | Lee et al. | 369/47.53 |
| 7,286,454 | B2 * | 10/2007 | Lee | 369/47.53 |
| 7,839,738 | B2 * | 11/2010 | Kim, II | 369/47.53 |
| 7,872,956 | B2 * | 1/2011 | Eguchi et al. | 369/47.53 |

FOREIGN PATENT DOCUMENTS

JP    2007-521606    8/2007
WO   WO 2005/001824 A1   1/2005

\* cited by examiner

*Primary Examiner* — Nabil Hindi
(74) *Attorney, Agent, or Firm* — Antonelli, Terry, Stout & Kraus, LLP.

(57) ABSTRACT

An optical disc apparatus capable of deriving optimum laser beam power even when OPC areas overlap with one another and a method for the apparatus. OPC result is recorded to an optical disc and OPC (area-saving OPC) that reduces an area use quantity by using the OPC result is executed and optimum laser power is determined.

21 Claims, 17 Drawing Sheets

RADIAL POSITION OF OPTICAL DISC 1

RADIAL POSITION OF OPTICAL DISC 1

RADIAL POSITION OF OPTICAL DISC 1

RADIAL POSITION OF OPTICAL DISC 1

RADIAL POSITION OF OPTICAL DISC 1

RADIAL POSITION OF OPTICAL DISC 1

RADIAL POSITION OF OPTICAL DISC 1

RADIAL POSITION OF OPTICAL DISC 1

RADIAL POSITION OF OPTICAL DISC 1

RADIAL POSITION OF OPTICAL DISC 1

RADIAL POSITION OF OPTICAL DISC 1

RADIAL POSITION OF OPTICAL DISC 1

RADIAL POSITION OF OPTICAL DISC 1

RADIAL POSITION OF OPTICAL DISC 1

| I01 | I02 | I03 | I04 | I05 |
|---|---|---|---|---|
| MANUFACTURER ID | OPTICAL DISC APPARATUS ID | LAYER INFORMATION | OPC RESULT | EFFECTIVE RANGE |

RECORDING APPARATUS AND RECORDING METHOD

INCORPORATION BY REFERENCE

The present application claims priority from Japanese application JP2009-296676 filed on Dec. 28, 2009, the content of which is hereby incorporated by reference into this application.

BACKGROUND OF THE INVENTION

This invention relates to a recording/reproducing apparatus and a recording/reproducing method.

Abstract of JP-A-2007-521606 describes as follows. "The invention relates to an information recording medium having a plurality of information recording layers and each of the information recording layers has an OPC area for obtaining an optimum recording condition. The OPC areas of odd-numbered information recording layers in a light incidence direction and the OPC areas of even-numbered information recording layers adjacent to the former are arranged alternately so as not come into contact with one another and an area of the OPC area of each recording information layer that can be used in practice is variable depending on the environment of use of each information recording layer. In consequence, the area of the information recording layer can be used efficiently while influences on other information recording layers are reduced to minimum even when optimum power control is made in the OPC area provided to each information recording layer".

SUMMARY OF THE INVENTION

In recordable and rewritable optical discs that are commercially available on the market at present such as BD-R (Blu-ray Disc Recordable) and BD-RE (Blu-ray Disc Rewritable), a processing called "OPC (Optimum Power Calibration)" is executed to regulate power of a laser beam emitted to the recording surface of the optical disc. Ordinary optical discs have a dedicated recording area (trial write area or OPC area) for conducting OPC and an optical disc apparatus makes recording to this OPC area at laser beam power smaller and greater than appropriate laser beam power to regulate the optimum laser beam power.

The reflection factor of the area recorded at power smaller or greater than the optimum power sometimes becomes inappropriate in comparison with the area recorded at the optimum power. Therefore, such an inappropriate reflection factor (reflectivity) sometimes affects adversely OPC when OPC must be made at deeper layers by emitting the laser beam through the recorded OPC areas in a multi-layered device in which the OPC areas of a plurality of layers overlap with one another, for example.

The patent document cited above describes the OPC area of the recording medium having a plurality of recording layers and studies only the arrangement to avoid overlap of the OPC area of each layer but does not consider how to execute OPC when the OPC area of each layer overlaps with one another.

In view of the background described above, the invention contemplates to provide a technology capable of appropriate power regulation (adjustment, calibration) even in a recording medium having a plurality of recording layers.

This object can be accomplished, for example, by the construction described in the appended claims. More concretely, the OPC result is recorded to the recording medium and OPC (area-saving OPC) saving an area use quantity is executed by using this OPC result.

The invention can execute appropriate power regulation even in recording media having a plurality of recording layers.

Other objects, features and advantages of the invention will become apparent from the following description of the embodiments of the invention taken in conjunction with the accompanying drawings.

DETAILED DESCRIPTION OF THE EMBODIMENTS

Preferred embodiments of the invention will be hereinafter explained with reference to the accompanying drawings.

Figure 1:
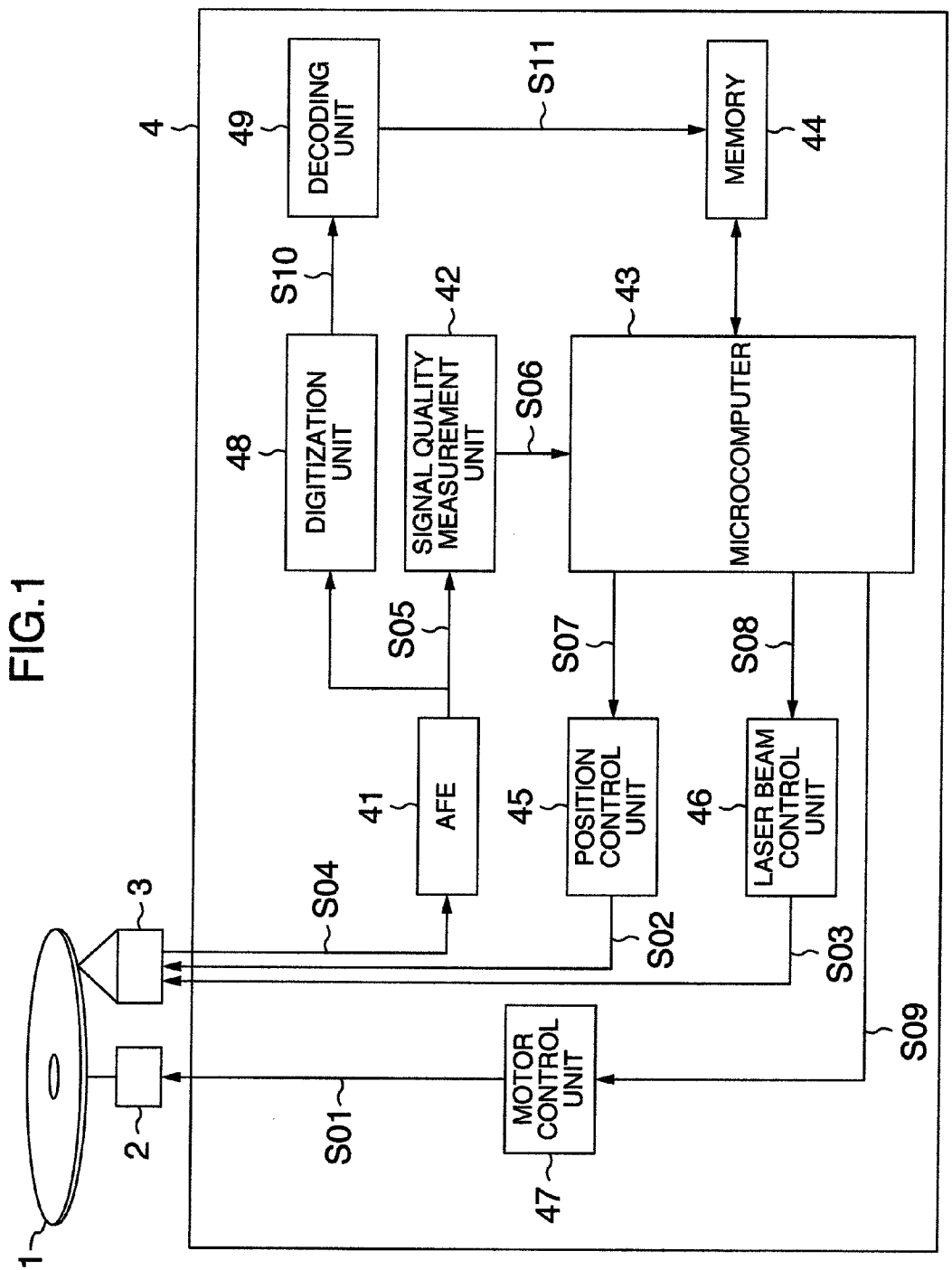
FIG. 1 is a block diagram showing a construction of an optical disc apparatus according to Embodiments 1 to 24 of the invention.

To begin with, Embodiment 1 will be explained with reference to FIGS. 1 to 8. FIG. 1 shows a structural example of an optical disc apparatus as an embodiment of the invention.

The optical disc apparatus according to this embodiment has a spindle motor 2 for driving and rotating an optical disc 1, an optical pickup 3 and a signal processing LSI 4 that executes signal processing.

Optical discs such as CD (Compact Disc), DVD (Digital Versatile Disc), BD (Blu-ray Disc) and so forth can be used as the optical disc 1 for recording and reproduction by the optical disc apparatus. However, the invention is in no way limited to these optical discs.

The spindle motor 2 is subjected to the motor rotation control by a motor control signal S01 from the signal processing LSI 4 and rotates the optical disc 1.

The optical pickup 3 is subjected to position control by a position control signal S02 from the signal processing LSI 4, moves in a radial direction of the optical disc 1 and to the position at which recording or reproduction is made. The optical pickup 3 is also subjected to laser beam control by a laser beam control signal S03 from the signal processing LSI 4 and emits a laser beam for recording or reproduction to the optical disc 1. The laser beam emitted is reflected by the optical disc 1 and a light reception unit of the optical pickup 3, not shown in the drawing, receives the reflected light. The light reception unit converts the reflected light to the electric signal S04 and outputs it to the signal processing LSI 4.

The signal processing LSI 4 includes an AFE (Analog Front End) 41, signal quality measurement unit 42, a microcomputer 43, a memory 44, position control unit 45, laser beam control unit 46, motor control unit 47, digitization unit 48 and decoding unit 49.

The AFE 41 executes an analog signal processing for amplifying the electric signal S04 outputted from the optical pickup 3 to generate an analog signal and outputs the analog signal S05 to the signal quality measurement unit 42 and to the digitization unit 48.

The signal quality measurement unit 42 measures signal quality of the analog signal S05 such as a beta value, a gamma value and a jitter value, calculates the measurement result and outputs measurement result information S06 to the microcomputer 43.

The microcomputer 43 controls each unit inside the optical disc apparatus. The microcomputer 43 controls software and the software processes the data on the basis of the measurement result information and regulates the laser beam power. At the time of the laser beam power regulation and signal quality measurement, the microcomputer 43 outputs a position control instruction S07 to the position control unit 45, a laser beam control instruction S08 to the laser beam control unit 46 and a motor control instruction S09 to the motor control unit 47. The microcomputer 43 appropriately writes and reads data to and from the memory 44. The microcomputer 43 controls the digitization unit 48 and the decoding unit 49 when the data of the optical disc 1 is reproduced.

The memory 44 is a storage unit such as an SDRAM (Synchronous Dynamic Random Access Memory) or a flash memory and stores data associated with the processing by the microcomputer 43.

The position control unit 45 receives the position control instruction S07 from the microcomputer 43 and outputs the position control signal S02 so that the optical pickup 3 can be moved to the write or read position.

The laser beam control unit 46 receives the laser beam control instruction S08 from the microcomputer 43 and outputs the laser beam control signal S03 to the optical pickup 3 so that the microcomputer 43 can record the data with designated recording power.

The motor control unit 47 receives the motor control instruction S09 from the microcomputer 43 and outputs the motor control signal S01 to the spindle motor 2 so that the spindle motor 2 rotates the optical disc at a designated speed.

The digitization unit 48 digitizes the analog signal S05 outputted by the AFE 41 and outputs the binary data S10 to the decoding unit 49.

The decoding unit 49 decodes the binary data S10 outputted by the digitization unit 48 and stores the decoded data S11 in the memory 44.

Figure 2:
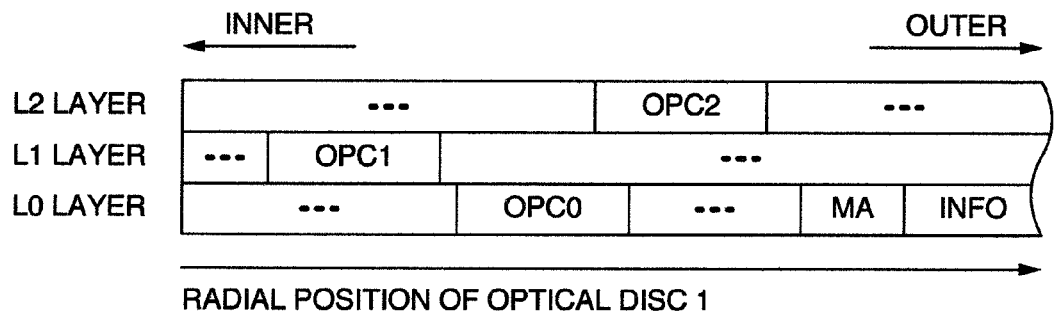
FIG. 2 is an explanatory view showing a construction of an optical disc according to Embodiments 1 to 3 and 19 to 24 of the invention.

FIG. 2 shows an example of the optical disc structure according to this embodiment. The optical disc shown in FIG. 2 has three-layered recording layers (L0 layer, L1 layer and L2 layer) and each layer has the OPC area as an area for regulating recording power of the laser beam. In this example, the OPC area (OPC0) of the L0 layer partly overlaps with the OPC area (OPC2) of the L2 layer. The laser beam from the optical pickup 3 is emitted from the L2 layer side to the optical disc 1. Unlike the ordinary data areas (not shown in the drawing), the OPC area executes recording while the recording power is changed from low power to high power to determine optimum power of the laser beam. The laser beam transmitted through the area where the recording power is increased, in particular, has different characteristics from the laser beam transmitted through the area where recording is made at optimum recording power. Therefore, signal quality changes when reproduction is made and eventually, recording power is likely to be regulated to recording power that is not optimal. When OPC0 and OPC2 do not overlap with each other from the standard of the optical disc, too, there is the possibility that OPC0 overlaps with OPC2 owing to variance of bonding and coating of the recording films during the manufacturing process of the optical disc 1 and similarly, the recording power is likely to be regulated to one that is not optimal. Therefore, this embodiment prevents the recording power from being regulated to the unsuitable power by conducting OPC in accordance with the following procedure. An MA area is the management area for recording the management information of the optical disc 1. The management information contains the information representing up to which addresses the OPC area of each layer is used or the information representing the start address of the OPC area that can be used next (hereinafter called "OPC address information"). The latest OPC address information is added before the optical disc 1 is taken out from the optical disc apparatus. An INFO area is the information area for recording the OPC result information when past OPC is made by the optical disc 1 and contains the information about the optical disc executing OPC when past recording is made and the OPC result. The latest OPC result is added whenever OPC is made. According to the BD-R standard, for example, recording is made to an INFO1/Drive area of an Inner-Zone. The information area is not particularly limited as long as the information capable of identifying the manufacturer of the optical disc and its model and the OPC result information can be recorded.

Incidentally, the address sequence for recording data to the OPC area is the ascending order in the following embodiments inclusive of this embodiment within the range of recording by one OPC but the leading address in the recording range by OPC is the descending order. In other words, recording is made to the OPC area in the block unit in the descending order the area used by OPC (called "block") from a greater address value.

Figure 3:
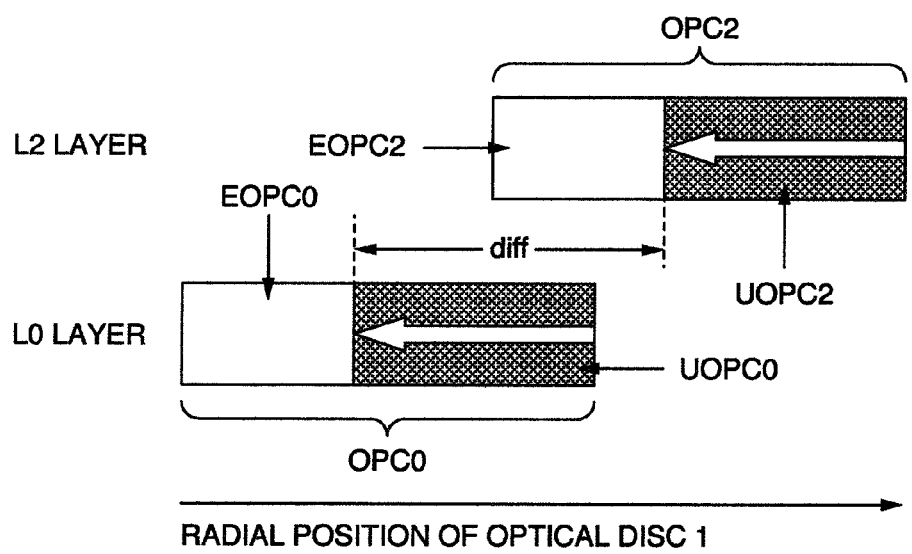
FIG. 3 is an explanatory view showing a utilization concept of an OPC area according to Embodiments 1 to 3 and 19 to 24 of the invention.

FIG. 3 conceptually shows the use state of the OPC area in this embodiment and shows the OPC area of the L0 layer (OPC0) and the OPC area of the L2 layer (OPC2). The OPC0 has an area (UOPC0) to which recording has already been made to regulate the recording power and an area (EOPC0) to which recording is not yet made. When OPC is not yet made even once in the L0 layer, the UOPC0 does not exist. Similarly, the OPC area of the L2 layer (OPC2) has an area (UOPC2) to which recording has already been made to regulate the recording power and an area (EOPC2) to which recording is not yet made. When OPC is not yet made even once in the L2 layer, the UOPC2 does not exist.

When the consumption quantity consumed by OPC of each layer is substantially equal in OPC0 and OPC2, EOPC0 and EOPC2 as the areas to which recording is not yet made do not have the overlapping area. Therefore, the recorded areas do not mutually affect the OPC result. The unit where EOPC0 and UOPC2 overlap mutually sometimes occurs when the consumption quantity by OPC in the L2 layer is greater than the consumption quantity by OPC in the L0 layer. The possibility exists at this time that the OPC result of the L0 layer is affected and the optimum power cannot be determined.

Figure 4:
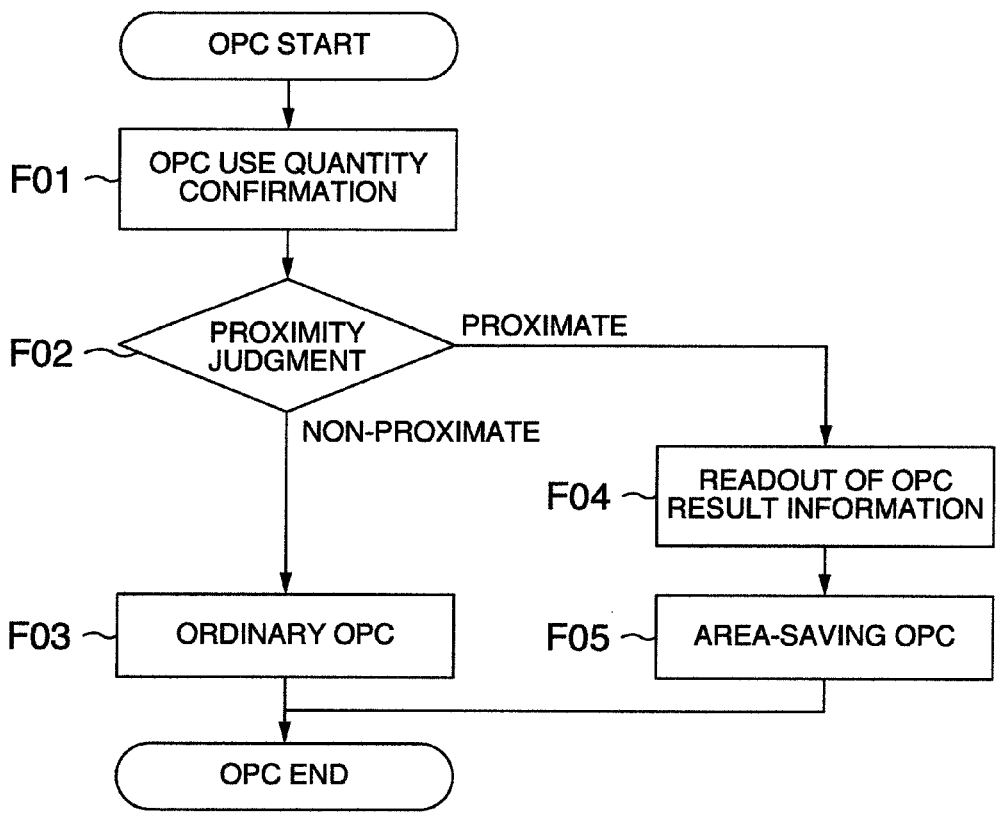
FIG. 4 is a flowchart showing an OPC processing flow according to Embodiments 1 to 18 of the invention.

FIG. 4 is a flowchart showing the OPC procedure executed by the software operating on the microcomputer 43 according to this embodiment. The explanation will be given hereinafter on the case where OPC is executed in the OPC 2 area. Though the embodiment uses hereby the software, a part or the whole may well be processed by hardware. The use of the hardware is sometimes more advantageous from the aspects of easier control and the space requirement.

When the OPC is started, the microcomputer 43 executes the OPC use quantity confirmation F01. In the OPC use quantity confirmation F01, the microcomputer 43 executes the control in the following way to determine the difference of the boundary (diff in FIG. 3) between the recorded area (UOPC0/2) and the non-recorded area (EOPC0/2) in the OPC area of each layer adjacent to one another when the OPC area is viewed at a radial position of the optical disc 1. The microcomputer 43 outputs the motor control instruction S09 to the motor control unit 47 and the motor control unit 47 outputs the motor control signal S01 to the spindle motor 2 to rotate the optical disc 1. After the number of revolutions of the optical disc 1 is controlled, the microcomputer 43 outputs the position control instruction S07 to the position control unit 45 so as to control the optical pickup 3 to the position at which the data of the MA area of the optical disc 1 is reproduced. The position control unit 45 outputs the position control signal S02 to the optical pickup 3 so that the optical pickup 3 can move to the data reproduction position of the MA area. After the optical pickup 3 is moved to the data reproduction position of the MA area, the microcomputer 43 outputs the laser beam control instruction S08 to the laser beam control unit 46 so as to reproduce the data of the MA area. The laser beam control unit 46 outputs the laser beam control signal S03 to the optical pickup 3 at the address position of the MA area on the optical disc 1 and executes reproduction. The optical pickup 3 emits the laser beam to the optical disc 1, receives the reflected light, converts the reflected light to the electric signal S04 and outputs the electric signal to the AFE41 of the signal processing LSI 4. The AFE41 executes the analog signal processing such as amplification of the electric signal S04 to generate the analog signal S05 and outputs the resulting signal to the digitization unit 48. The digitization unit 48 digitizes the analog signal S05 and outputs the binary data S10 to the decoding unit 49. The decoding unit 49 decodes the binary data S10 to generate the decoded data S11 and stores the data in the memory 44. The microcomputer 43 reads out the decoded data S11 and the latest OPC address information of each layer contained in the MA area and computes the difference the distance of the radial position (diff in FIG. 3) between the OPC address of OPC2 for executing OPC and the OPC address information of adjacent OPC0 from the information.

Proximity judgment F02 is conducted after the OPC use quantity confirmation F01 is completed. In this proximity judgment F02, the degree of proximity of the boundary between the recorded area and the non-recorded area is judged by comparing the diff value calculated in the OPC use quantity confirmation F01 and a predetermined threshold value α. When the diff value is greater than this value α, the degree of proximity is judged as non-proximate and ordinary OPC F03 is executed with EOPC2 of OPC2 of the L2 layer. When the diff value is smaller than α, readout of OPC result information F04 is executed. The threshold value α is calculated on the basis of the position error in the formation of the recording film during the manufacturing process of the optical disc 1.

Figure 5:
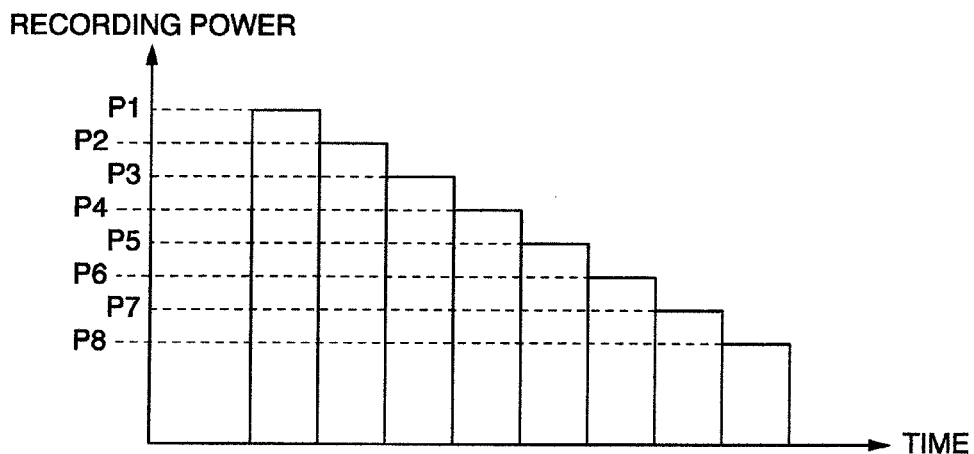
FIG. 5 is an explanatory view schematically showing a stage of laser beam power in an ordinary OPC processing according to Embodiments 1 to 23 of the invention.

Ordinary OPC F03 is executed when the boundary is judged as non-proximate in the proximity judgment F02. In this ordinary OPC F03, the laser beam power is changed over several stages and signal quality is judged in each stage to determine optimum laser beam power for recording on the basis of the relation between the laser beam power and the signal quality measurement result. FIG. 5 shows the case where the laser beam power is changed over eight stages by way of example. Recording is made at the laser beam power P1 at the start of the processing and the laser beam power is then changed to P2, P3, . . . P8. The relation of the laser beam power among P1 to P8 shown in FIG. 5 is merely illustrative and the sequence of the laser beam power P1 to P8 and the number of stages can be decided arbitrarily.

The operation is made in the following way in ordinary OPC F03. The microcomputer 43 outputs the motor control instruction S09 to the motor control unit 47 and the motor control unit 47 outputs the motor control signal S01 to the spindle motor 2 to rotate the optical disc 1. After the rotation of the optical disc 1 is controlled, the microcomputer 43 outputs the position control instruction S07 to the position control unit 45 so that the optical pickup 3 is controlled to the position at which the data of EOPC0 area of the optical disc 1 is recorded. The position control unit 45 outputs the position control signal S02 to the optical pickup 3 so that the optical pickup 3 moves to the position at which the data of the EOPC0 area is recorded. After the optical pickup 3 is moved to the EOPC area, the microcomputer 43 outputs the laser beam control instruction S08 to the laser beam control unit 46 so as to record the data at the selected laser beam power to the EOPC0 area. The laser beam control unit 46 outputs the laser beam control signal S03 to the optical pickup 3 at the address position of the EOPC0 area on the optical disc 1 and executes recording. After recording at the selected laser beam power is completed, different laser beam power is selected and recording is likewise made. After recording is made in this way at all the levels of laser beam power, signal quality evaluation is made. In this signal quality evaluation, the microcomputer 43 outputs the motor control signal S09 to the motor control unit 47 and the motor control unit 47 outputs the motor control signal S01 to the spindle motor 2 to rotate the optical disc 1. After the rotation of the optical disc 1 is controlled, the microcomputer 43 outputs the position control instruction S07 to the position control unit 45 and the position control unit 45 outputs the position control signal S02 to the optical pickup 3 so that the optical pickup 3 moves to the EOPC0 area. After the optical pickup 3 is moved to the EOPC0 area, the microcomputer 43 outputs the laser beam control signal S08 to the laser beam control unit 46 so that the data of the EOPC area can be reproduced. The laser beam control unit 46 outputs the laser beam control signal S03 at the address position of the EOPC0 area on the optical disc 1 and executes reproduction. The optical pickup 3 emits the laser beam to the optical disc 1, receives the reflected light, converts the reflected light to the electric signal S04 and outputs the electric signal S04 to AFE41 of the signal processing LSI4. The AFE41 executes the processing such as amplification of the electric signal S04 to generate the analog signal S05 and outputs the analog signal S05 to the signal quality measurement unit 42. The signal quality measurement unit 42 measures signal quality of the analog signal S05 such as the beta value, the gamma value and the jitter value, calculates the measurement result and outputs the measurement result information S06 to the microcomputer 43. The microcomputer 43 allows the memory 44 to store the measurement result information S06. This measurement is made similarly for the area recorded at the laser beam power of each stage and the measurement result information S06 is stored in the memory 44. The microcomputer 43 reads out these measurement result information S06 from the memory 44, calculates the optimum laser beam power on the basis of the measurement result information and records the information of the optimum laser beam power to the INFO area of the optical disc 1 whenever ordinary OPC F03 is made.

Figure 6:
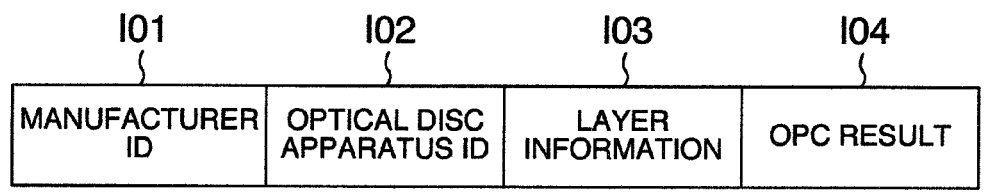
FIG. 6 is an explanatory view schematically showing an example of OPC result information according to Embodiments 1 to 22 and 24 of the invention.

FIG. 6 shows an example of the OPC result information to be recorded to the INFO area. The OPC result information has a manufacturer ID I01 as the information for identifying the manufacturer of the optical disc apparatus, an optical disc apparatus ID I02 for identifying the model of the optical disc apparatus, layer information I03 for representing the layer executing OPC and the OPC result I04.

Readout of OPC result information F04 is executed when the boundary is judged as proximate in the proximity judgment F02. In this Readout of OPC result information F04, the INFO area of the optical disc 1 is retrieved and the manufacturer ID I01 and the optical disc apparatus ID I02 read out the OPC result in the layer in ordinary OPC F03 of the latest recording among those which are coincident with the optical disc apparatus itself. The operation is made in the following way in readout of the OPC result information. The microcomputer 43 outputs the motor control instruction S09 to the motor control unit 47 and the motor control unit 47 outputs the motor control signal S01 to the spindle motor 2 to rotate the optical disc 1. After the rotation of the optical disc 1 is controlled, the microcomputer 43 outputs the position control instruction S07 to the position control unit 45 to control the optical pickup 3 to the position at which the data of the INFO area of the optical disc 1 is reproduced. The position control unit 45 outputs the position control signal S02 to the optical pickup 3 to move the optical pickup 3 to the position at which the data of the INFO area is reproduced. After the optical pickup 3 is moved to the position at which the data of the INFO area is reproduced, the microcomputer 43 outputs the laser beam control instruction S08 to the laser beam control unit 46 to reproduce the data of the INFO area. The laser beam control unit 46 outputs the laser beam control signal S03 to the optical pickup 3 at the address position of the INFO area on the optical disc 1 and executes reproduction. The optical pickup 3 emits the laser beam to the optical disc 1, receives the reflected light, converts it to the electric signal S04 and outputs the electric signal S04 to AFE 41 of the signal processing LSI4. The AFE 41 executes the analog signal processing such as amplification of the electric signal S04 to generate the analog signal S05 and outputs the analog signal S05 to the digitization unit 48. The digitization unit 48 executes digitization of the analog signal S05 and outputs the binary data S10 to the decoding unit 49. The decoding unit 49 decodes the binary data S10 to generate the decoded data S11 and stores it in the memory 44. The microcomputer 43 reads out the decoded data S11, retrieves the data having the manufacturer ID I01 and the optical disc apparatus ID I02 that are coincident with those of its own from the decoded data S11 and reads out the OPC result I03 attached to this ID. When a plurality of data which have coincident manufacturer ID I01 and coincident optical disc apparatus ID I02 and the layer information I03 of which is the corresponding layer exists, the latest OPC result information is read out.

Figure 7:
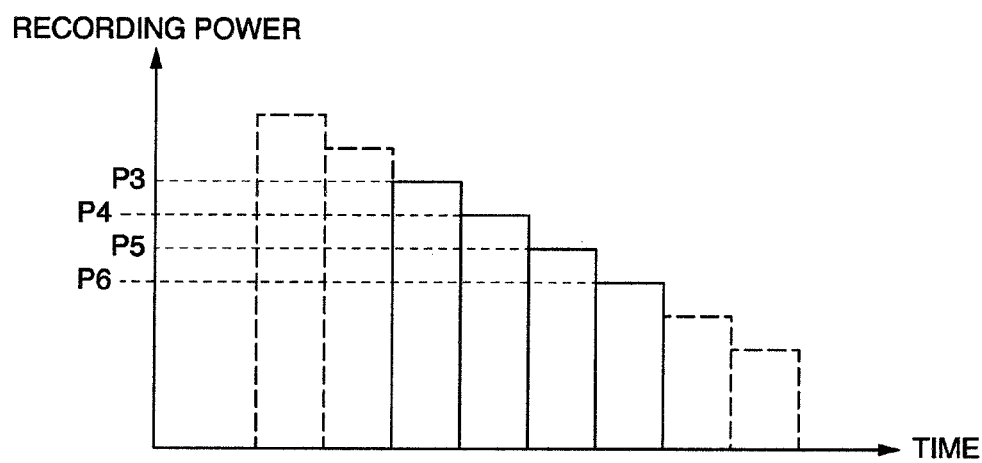
FIG. 7 is an explanatory view schematically showing a stage of laser beam power in an area-saving OPC processing according to Embodiments 1, 4, 7, 10, 13, 16 and 19 to 24 of the invention.

After readout of OPC result information F04 is made, area-saving OPC F05 is executed. In this area-saving OPC F05, the laser beam power is changed over several stages and signal quality measurement is made in each of the stages. Optimum laser beam power for recording is determined on the basis of the relation between the laser beam power and the signal quality measurement result in the same way as in ordinary OPC F03. However, the number of stages for changing the laser beam power is smaller than that of ordinary OPC F03. The range for changing the laser beam power is limited to the proximity of the laser beam power value of the OPC result and is narrowed on the basis of the OPC result read out in readout of OPC result information F04. FIG. 7 shows an example where the laser beam power is changed in four stages. Recording is made at the start of the processing by setting the laser beam power to P3 and is subsequently changed to P4, P5 and P6. The intensity of the laser beam power of P3 to P6 in FIG. 7 is merely illustrative and the sequence of the laser beam power P3 to P6 and the number of stages can be set arbitrarily provided that the number of stages is smaller than that of ordinary OPC F03.

The operation in area-saving OPC F05 is the same as that of ordinary OPC F03 with the exception that the selection of the laser beam power is different as described above and the detailed explanation will be omitted.

Next, the explanation will be given on the case where OPC is executed in the L0 layer. OPC in the L0 layer is made in the same way as the case where OPC is made in the L2 layer. Namely, the difference of the distance of the radial position (diff in FIG. 3) is calculated from the OPC address information of OPC0 where OPC is to be made and the OPC address information of proximate OPC2 when viewed at the radial position and whether ordinary OPC or area-saving OPC is made is judged from the calculation result. In this way, consumption of the OPC0 area can be limited. When the difference of the distance of the radial position (diff in FIG. 3) increases by conducting OPC even though the difference of the distance of the radial position (diff in FIG. 3) is smaller than the threshold value, ordinary OPC may well be executed because overlap of EOPC0 with UOPC2 can be avoided by so doing.

Figure 8:
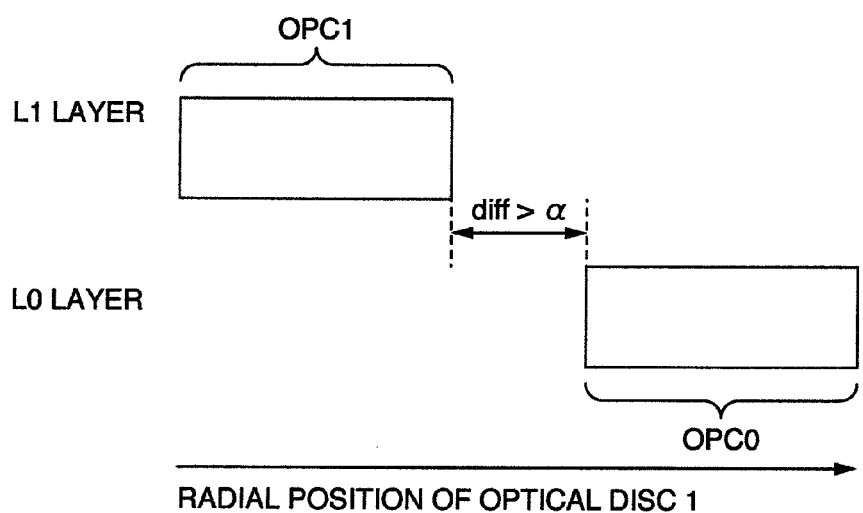
FIG. 8 is an explanatory view schematically showing a positional relation among OPC areas of L0 and L1 layers according to Embodiments 1 to 3 and 19 to 24 of the invention.

Next, the explanation will be given on the case where OPC is executed in the L1 layer. FIG. 8 shows schematically the positional relation between the OPC area of the L0 layer (OPC0) and the OPC area of the L1 layer (OPC1). OPC0 and OPC1 do not overlap with each other at a position on the radius of the optical disc 1 and the difference on the radial position (diff) is greater than the aforementioned a value. Therefore, ordinary OPC is executed irrespective of the use quantity of the OPC area when OPC of the L1 layer is made.

Embodiment 2 of the invention will be explained. The difference of Embodiment 2 from Embodiment 1 resides in that the stages of the optical beam power are selected by decreasing the number of stages whereas the range for changing the laser beam power is limited to the proximity of the laser beam power of the OPC result and is thus narrowed in the first embodiment.

Figure 9:
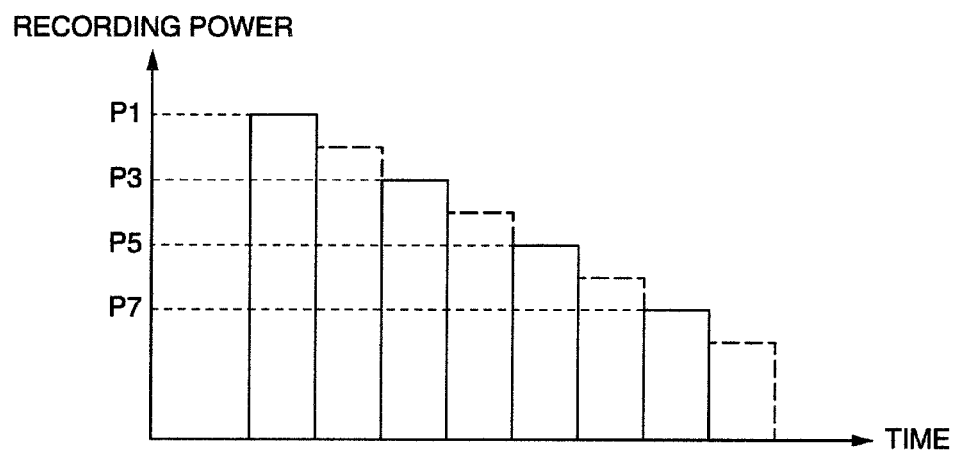
FIG. 9 is an explanatory view schematically showing a stage of laser beam power in an area-saving OPC processing according to Embodiments 2, 5, 8, 11, 14, 17 and 19 to 22 of the invention.

FIG. 9 shows the stages of the laser beam power in Embodiment 2. In this embodiment, recording is not made at the laser beam power of P2, P4, P6 and P8 but is made at the laser beam power of P1, P3, P5 and P7.

In this embodiment, recording at the laser beam power of P2, P4, P6 and P8 is thinned out but the laser power of which stage is to be thinned out is not particularly limited as long as the same effect can be obtained.

Next, Embodiment 3 will be explained. The difference of the third embodiment from the first embodiment resides in that the stages of the optical beam power are selected in area-saving OPC F05 by decreasing the number of stages in the proximity of the laser beam power value of the OPC result and in the stages of the laser beam power other than those in the proximity of the former.

Figure 10:
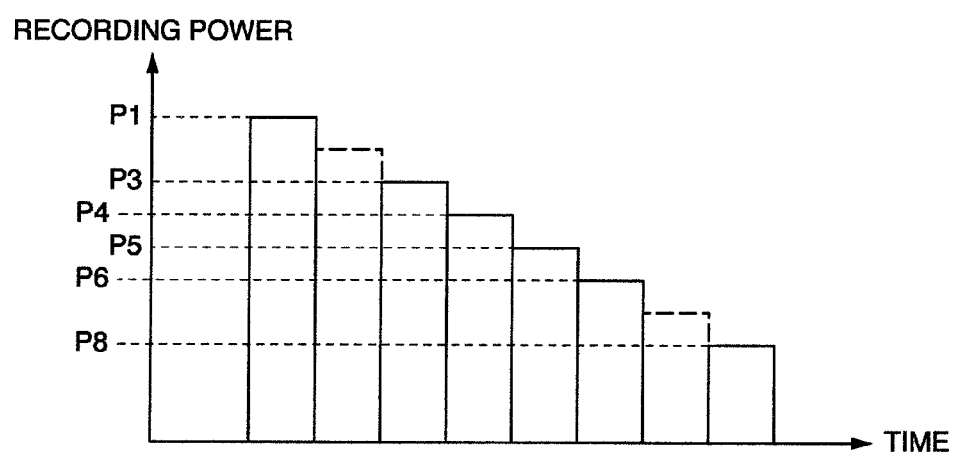
FIG. 10 is an explanatory view schematically showing a stage of laser beam power in an area-saving OPC processing according to Embodiments 3, 6, 9, 12, 15, 18 and 19 to 22 of the invention.

FIG. 10 shows the stages of the laser beam power in Embodiment 3. In the third embodiment, recording is made at the laser beam power of P3 to P6 as the proximate values to the laser beam power of the OPC result and P1 and P8 other than the proximate values but is not made at the laser beam power of P2 and P7.

In this embodiment, recording is not made at the laser beam power of P2 and P7 but laser beam power of which stage is to be omitted is not particularly limitative as long as similar effects can be obtained.

Figure 11:
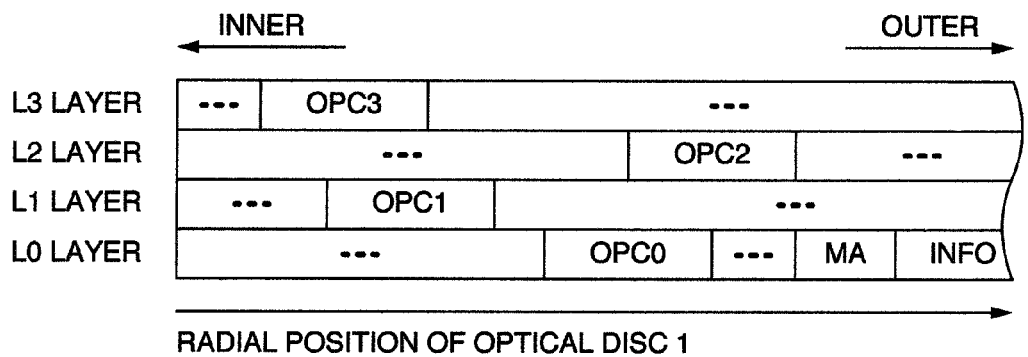
FIG. 11 is an explanatory view showing a construction of an optical disc according to Embodiments 4 to 6 and 19 to 24 of the invention.

Embodiment 4 will be explained. FIG. 11 shows an example of the optical disc construction in this embodiment. The optical disc shown in FIG. 11 has four recording layers (L0 layer, L1 layer, L2 layer and L3 layer). The OPC area as the area for regulating the recording power of the laser beam in each layer and the OPC area of the L0 layer (OPC0) overlaps partly with the OPC area of the L2 layer (OPC2) and the OPC area of the L1 layer (OPC1) partly overlaps with the OPC layer of the L3 layer (OPC3) in the same way as in the three-layered optical disc construction shown in FIG. 2. The optical beam from the optical pickup 3 is emitted from the L3 layer side to the optical disc 1. The explanation of the MA area and INFO area will be omitted because they are the same as those of the three-layered optical disc construction shown in FIG. 2.

Figure 12:
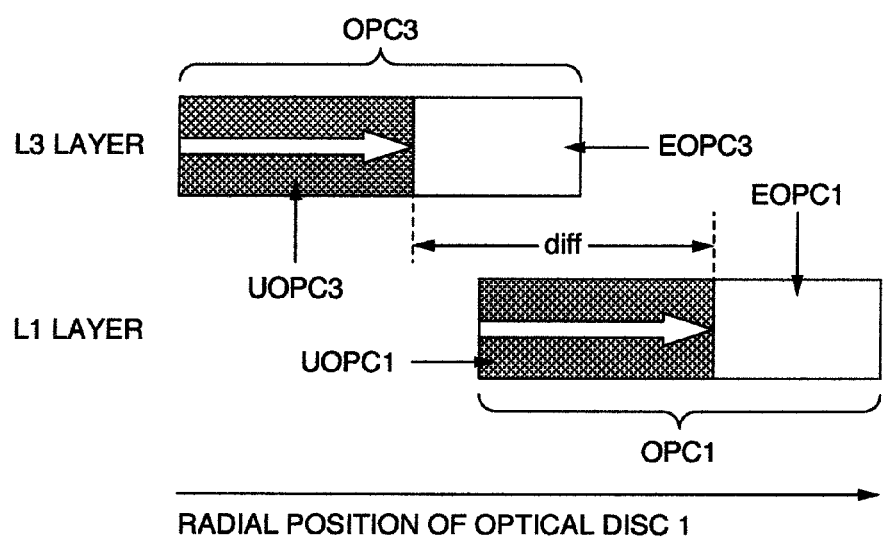
FIG. 12 is an explanatory view showing a utilization concept of an OPC area according to Embodiments 4 to 6 and 19 to 24 of the invention.

Since the OPC processing executed in OPC0 and OPC2 in the fourth embodiment is the same as that of the first embodiment, the explanation will be omitted. FIG. 12 shows the OPC area of the L1 layer (OPC1) and the OPC area of the L3 layer (OPC3) in FIG. 11. OPC1 includes the area recorded already for regulating the recording power (UOPC1) and the area not yet recorded (EOPC1). When OPC is not made even once in the L1 layer, UOPC1 does not exist. Similarly, OPC area of the L3 layer (OPC3) includes the area recorded already for regulating the recording power (UOPC3) and the area not yet recorded (EOPC3). When OPC is not made even once in the L3 layer, UOPC3 does not exist.

When the consumption quantity consumed for OPC in each layer is substantially equal in OPC1 and OPC3, EOPC1 and EOPC3 as the non-recorded areas do not have the mutually overlapping portion. Therefore, the recorded areas do not mutually affect the OPC result. When the consumption quantity consumed for OPC in the L3 layer is greater than the consumption quantity consumed for OPC in the L1 layer, on the other hand, EOPC1 and EOPC 3 sometime overlap partially with each other. In this case, there is the possibility that the OPC result of the L1 layer is affected and optimum power cannot be determined.

The explanation will be given on the case where OPC is made in the OPC3 area. The operation of executing OPC in the OPC3 area is the same as the OPC operation in the OPC2 area in the first embodiment and the explanation can be given by replacing the OPC2 area in the first embodiment by the OPC3 area.

When OPC is made in the OPC1 area, too, the operation of executing OPC is the same as the OPC operation in the OPC0 area in the first embodiment and the explanation can be given by replacing the OPC0 area in the first embodiment by the OPC1 area.

The threshold value a for judging whether ordinary OPC F03 or area-saving OPC F05 is to be made may be set in common for the combination of OPC0 with OPC2 and the combination of OPC1 with OPC3.

Embodiment 5 will be explained. The difference of the fifth embodiment from the fourth embodiment resides in that the range for changing the laser beam power is limited to the proximity of the laser beam power of the OPC result and is thus narrowed in the OPC result in the fourth embodiment but in the fifth embodiment, the number of stages of the laser beam power in ordinary OPC F03 is decreased and selected. Because the stages of the laser beam power in the fifth embodiment is the same as that of the second embodiment, its explanation will be omitted.

Embodiment 6 will be explained. The difference of the sixth embodiment from the fourth embodiment resides in that the range for changing the laser beam power is limited to the proximity of the laser beam power of the OPC result and the stages of the laser beam power are thinned out at the optical power values other than the proximity value in the area-saving OPC F05. Because the number of stages of the laser beam power in the sixth embodiment is the same as that of the third embodiment, its explanation will be omitted.

Figure 13:
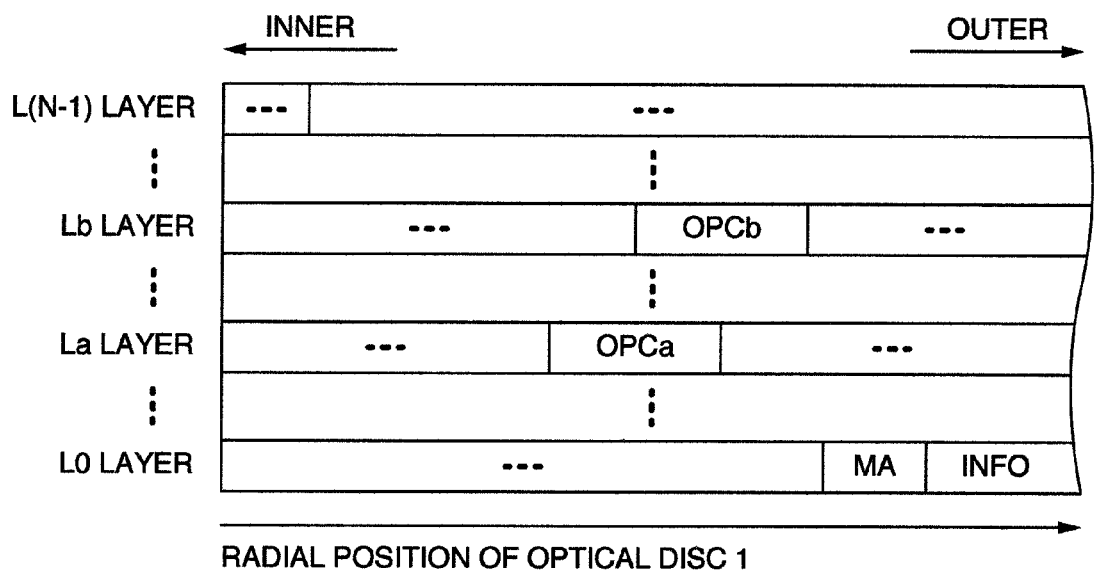
FIG. 13 is an explanatory view showing a construction of an optical disc according to Embodiments 7 to 9 and 19 to 24 of the invention.

Embodiment 7 will be explained. FIG. 13 shows a structural example of the optical disc 1 in the seventh embodiment. The optical disc 1 shown in FIG. 13 has N layers (N: natural number of 2 or more) of recording layers (L0 layer, ..., L(N−1) layer) and each layer has the OPC area. (Not all the layers are shown in the drawing). FIG. 13 shows the case where the OPC area of the La layer (OPCa) and the OPC area of the Lb layer (OPCb) overlap partially with each other. Here, each of a and b is an integer greater than 0 but not greater than (N−1). The explanation of the MA area and the INFO area will be omitted because they are the same as those of the construction of the three-layered optical disc shown in FIG. 2. The laser beam from the optical pickup 3 is emitted from the (N−1) layer side to the optical disc 1.

Figure 14:
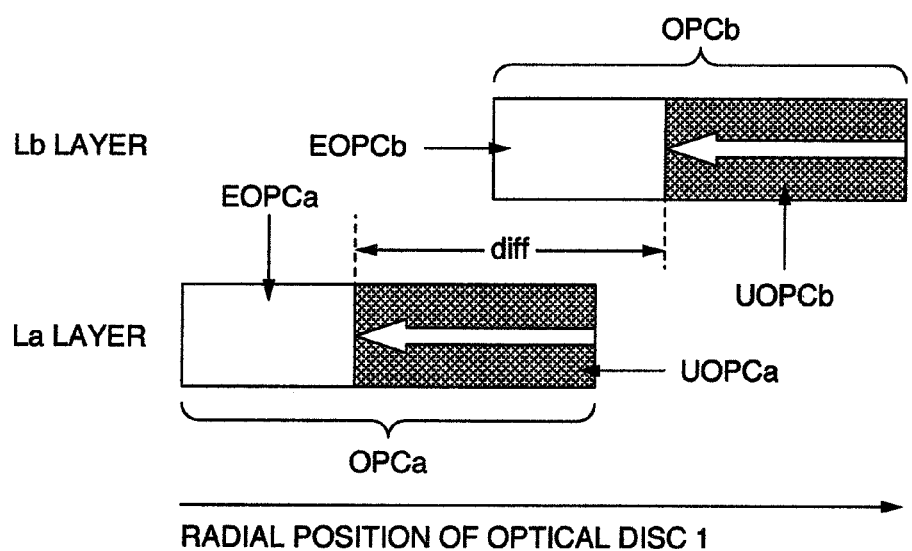
FIG. 14 is an explanatory view showing a utilization concept of an OPC area according to Embodiments 7 to 9 and 19 to 24 of the invention.

FIG. 14 is a conceptual view of the use state of the OPC area in this embodiment and shows the OPC area of the La layer (OPCa) and the OPC layer of the Lb layer (OPCb) in FIG. 13. It will be assumed hereby that no OPC area exists which overlaps even partially with the OPCa area in the layers on the L0 layer side from OPCa when viewed at a radial position. OPCa includes the area (UOPCa) to which recording is made to regulate the recording power and the area (EOPCa) which is not yet recorded. UPOCa does not exist when OPC is not made even once in the La layer. Similarly, the OPC area of the Lb layer (OPCb) includes the area (UOPCb) to which recording is made to regulate the recording power and the area (EOPCb) which is not yet recorded. UPOCb does not exist when OPC is not made even once in the Lb layer.

When the consumption quantity consumed by OPC of each layer is substantially equal in OPCa and OPCb, EOPCa and EOPCb as the non-recorded areas do not have the overlapping portion as shown in FIG. 14. Therefore, the recorded areas do not mutually affect the OPC result. When the consumption quantity consumed by OPC in the Lb layer is greater than the consumption quantity consumed by OPC in the La layer, on the other hand, EOPCa and UOPCb sometimes overlap with each other and affect at this time the OPC result of the La layer. Therefore, there is the possibility that optimum power cannot be determined.

The OPC processing executed in OPCb in this embodiment is the same as the OPC processing executed in OPC0 in the first embodiment and the explanation will be omitted because it can be made by replacing OPC2 in Embodiment 1 by OPCb.

The OPC processing executed in OPCa is the same as the OPC processing executed in OPC0 in the first embodiment and the explanation will be omitted because it can be made by replacing OPC0 in Embodiment 1 by OPCa.

Embodiment 8 will be explained. The difference of the eighth embodiment from the seventh embodiment resides in that the range for changing the laser beam power is limited to the proximity of the laser beam power of the OPC result and is thus narrowed in the area-saving OPC F05 in the seventh embodiment but in the eighth embodiment, the stage of the laser beam power in ordinary OPC F03 is thinned out and selected. The stage of the laser beam power in the eighth embodiment is the same as that of the second embodiment and its explanation will be omitted.

Embodiment 9 will be explained. The difference of the ninth embodiment from the seventh embodiment resides in that the range for changing the laser beam power is limited to the proximity of the laser beam power of the OPC result and the stage of the laser beam power in ordinary OPC F03 is thinned out and selected at portions other than the proximity of the OPC result. The stage of the laser beam power in the ninth embodiment is the same as that of the third embodiment and its explanation will be omitted.

Figure 15:
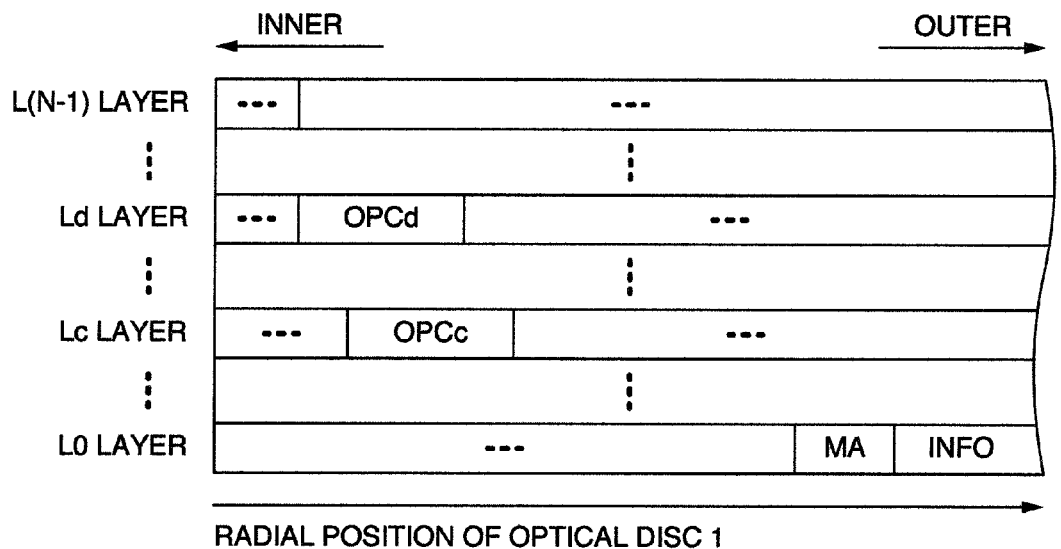
FIG. 15 is an explanatory view showing a construction of an optical disc according to Embodiments 10 to 12 and 19 to 24 of the invention.

Embodiment 10 will be explained. FIG. 15 shows a structural example of the optical disc 1 in the tenth embodiment. The optical disc 1 shown in FIG. 15 has N layers (N: natural number of 2 or more) of recording layers (L0 layer ..., L(N−1) layer) and each layer has the OPC area. (Not all the layers are shown in the drawing). FIG. 15 shows the case where the OPC area of the Lc layer (OPCc) and the OPC area of the Ld layer (OPCd) overlap partially with each other. Here, each of c and d is an integer greater than 0 but not greater than (N−1). The explanation of the MA area and the INFO area will be omitted because they are the same as those of the construction of the three-layered optical disc 1 shown in FIG. 2. The laser beam from the optical pickup 3 is emitted from the (N−1) layer side to the optical disc 1.

Figure 16:
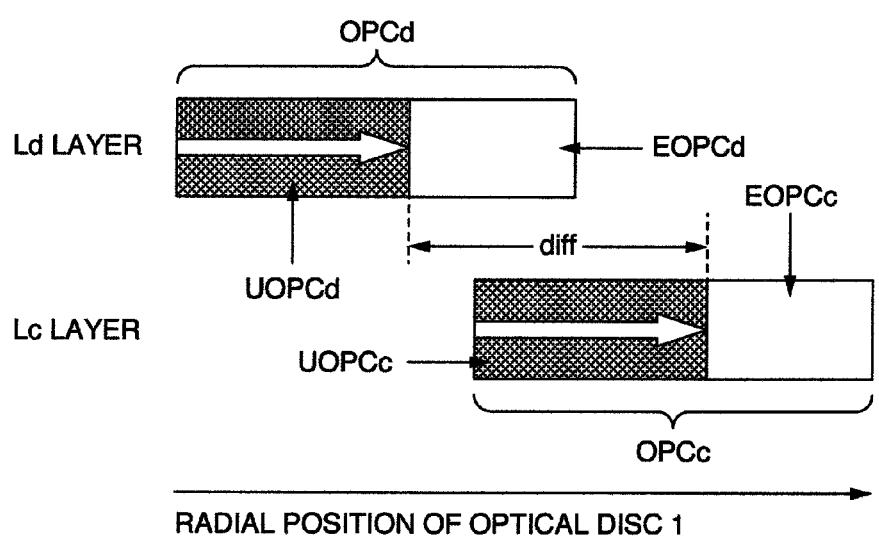
FIG. 16 is an explanatory view showing a utilization concept of an OPC area according to Embodiments 10 to 12 and 19 to 24 of the invention.

FIG. 16 is a conceptual view of the use state of the OPC area in this embodiment and shows the OPC area of the Lc layer (OPCc) and the OPC layer of the Ld layer (OPCd) in FIG. 15. It will be assumed hereby that no OPC area exists which overlaps even partially with the OPCc area in the layers on the L0 layer side from OPCc when viewed at a radial position. OPCc includes the area (UOPCc) to which recording is already made to regulate the recording power and the area (EOPCc) which is not yet recorded. UPOCc does not exist when OPC is not made even once in the Lc layer. Similarly, the OPC area of the Ld layer (OPCd) includes the area (UOPCd) to which recording is already made to regulate the recording power and the area (EOPCd) which is not yet recorded. UPOCd does not exist when OPC is not made even once in the Ld layer.

When the consumption quantity consumed by OPC of each layer is substantially equal in OPCc and OPCd, EOPCc and EOPCd as the non-recorded areas do not have the overlapping portion as shown in FIG. 16. Therefore, the recorded areas do not mutually affect the OPC result. When the consumption quantity consumed by OPC in the Ld layer is greater than the consumption quantity consumed by OPC in the Lc layer, on the other hand, EOPCc and UOPCd sometime overlap with each other and affect at this time the OPC result of the Lc layer. Therefore, there is the possibility that optimum power cannot be determined.

The OPC processing executed in OPCd in this embodiment is the same as the OPC processing executed in OPC2 in the first embodiment and the explanation will be omitted because it can be made by replacing OPC2 in Embodiment 1 by OPCd.

The OPC processing executed in OPCc is the same as the OPC processing executed in OPC0 in the first embodiment and the explanation will be omitted because it can be made by replacing OPC0 in Embodiment 1 by OPCc.

Embodiment 11 will be explained. The difference of the eleventh embodiment from the tenth embodiment resides in that the range for changing the laser beam power is limited to the proximity of the laser beam power of the OPC result and is thus narrowed in the area-saving OPC F05 in the tenth embodiment but in the eleventh embodiment, the stages of the laser beam power in ordinary OPC F03 are thinned out and selected. The stage of the laser beam power in the eleventh embodiment is the same as that of the second embodiment and its explanation will be omitted.

Embodiment 12 will be explained. The difference of the twelfth embodiment from the tenth embodiment resides in that the range for changing the laser beam power is limited to the proximity of the laser beam power of the OPC result and is thus narrowed in the area-saving OPC F05 but in the twelfth embodiment, the stages of the laser beam power other than the proximity of the former are thinned out and selected. The stage of the laser beam power in the twelfth embodiment is the same as that of the second embodiment and its explanation will be omitted.

Figure 17:
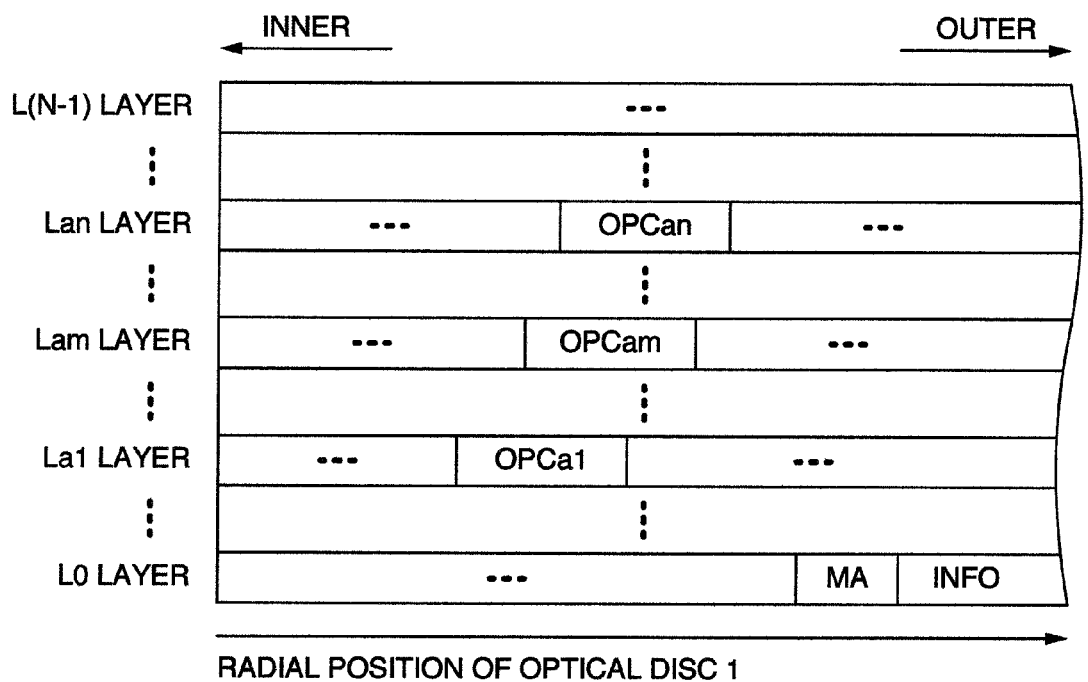
FIG. 17 is an explanatory view showing a construction of an optical disc according to Embodiments 13 to 15 and 19 to 24 of the invention.

Embodiment 13 will be explained. FIG. 17 shows a structural example of the optical disc 1 in the thirteenth embodiment. The optical disc 1 shown in FIG. 17 has N layers (N: natural number of 2 or more) of recording layers (L0 layer . . . , L(N−1) layer) and each layer has the OPC area. (Not all the layers are shown in the drawing). FIG. 17 shows the case where the OPC area of the La1 layer (OPCa1) and n layers of the OPC area of the Lan layer (OPCan) overlap partially with each other. Here, n is an integer greater than 0 but not greater than (N−1). The explanation of the MA area and the INFO area will be omitted because they are the same as those of the construction of the three-layered optical disc shown in FIG. 2. The laser beam from the optical pickup 3 is emitted from the (N−1) layer side to the optical disc 1.

Figure 18:
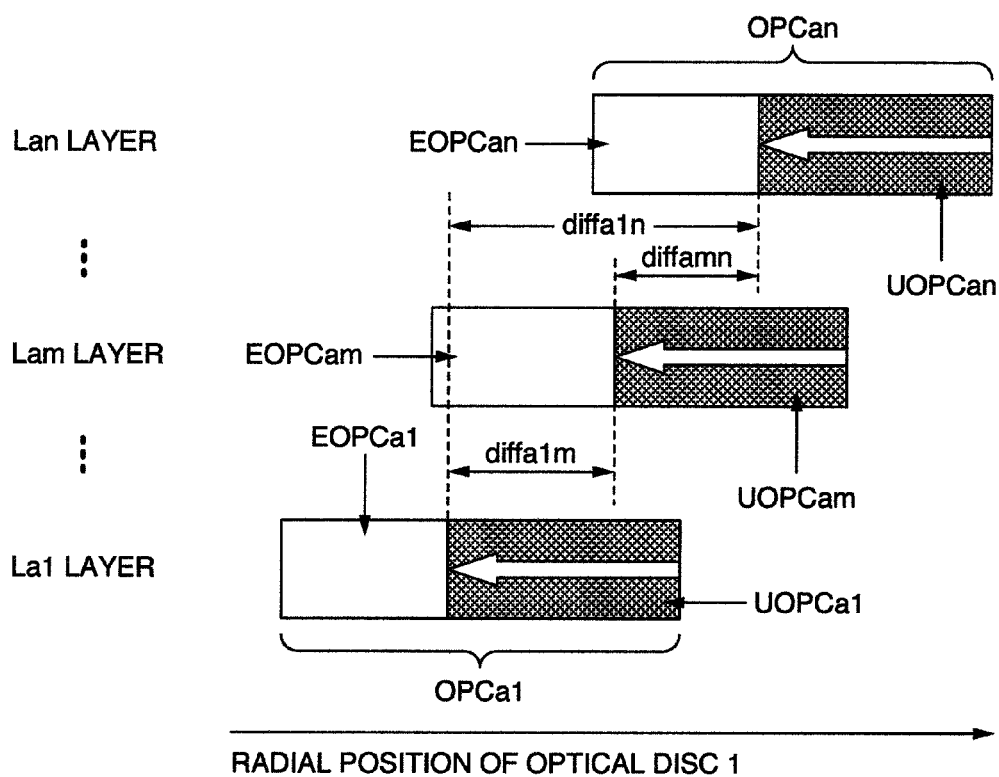
FIG. 18 is an explanatory view showing a utilization concept of an OPC area according to Embodiments 13 to 15 and 19 to 24 of the invention.

FIG. 18 is a conceptual view of the use state of the OPC area in this embodiment and shows the OPC area of the La1 layer (OPCa1) and the OPC area of the Lam layer (OPCam) in FIG. 17. Here, m is an integer of 1 to n. It will be assumed that no OPC area exists which overlaps even partially with the OPCa1 area in the layers on the L0 layer side from OPCa1 when viewed at a radial position. OPCa1 includes the area (UOPCa1) to which recording is already made to regulate the recording power and the area (EOPCa1) which is not yet recorded. UOPCa1 does not exist when OPC is not made even once in the La1 layer. Similarly, the OPC area of the Lam layer (OPCam) includes the area (UOPCam) to which recording is already made to regulate the recording power and the area (EOPCam) which is not yet recorded. UOPCam does not exist when OPC is not made even once in the Lam layer. Similarly, the OPC area of the Lan layer (OPCan) includes the area (UOPCan) to which recording is already made to regulate the recording power and the area (EOPCan) which is not yet recorded. UOPCan does not exist when OPC is not made even once in the Lan layer.

The difference of the OPC processing made in OPCan in this embodiment from the OPC processing made in OPCb in the seventh embodiment resides in that in the proximity judgment F02 in FIG. 4, the difference of the boundary (diffa1n, etc in FIG. 18) between the recorded area (UOPCa1 to UOPCan) in the OPC area of each of adjacent layers when the OPC area is viewed at a radial position of the optical disc 1 and the non-recorded area (EOPCa1 to EOPCan) is determined for the OPC area of all the layers overlapping with OPCan (diffa1n to diffamn in FIG. 18; m=n−1), ordinary OPC F03 is executed when the result is greater than the threshold value α and readout OPC result information F04 is made when any of diffa1n to diffamn (m=n−1) is smaller than the threshold value α. The rest are the same as the OPC processing made in OPCb in the seventh embodiment and the explanation will be therefore omitted.

Next, the case where OPC is executed in the Lam layer will be explained. In the same way as when OPC is made in the Lam layer, too, the difference of the distance of the radial position (diffa1m, etc in FIG. 18) is calculated from the OPC address information of OPCam for which OPC is to be made and the OPC address information of the OPC areas of all the layers whose OPC areas overlap with OPCam and whether ordinary OPC or area-saving OPC is to be made is judged depending on the calculation result. In this way, consumption of the OPCam area can be suppressed.

Next, the case where OPC is executed in the La1 layer will be explained. In the same way as when OPC is made in the Lan layer, the difference of the distance of the radial position (diffa1m, etc in FIG. 18) is calculated from the OPC address information of OPCa1 for which OPC is to be made and the OPC address information of the OPC areas of all the layers the OPC areas of which overlap with OPCa1 and whether ordinary OPC or area-saving OPC F05 is to be made is judged depending on the calculation result. In this way, consumption of the OPCa1 area can be suppressed.

Embodiment 14 will be explained. The difference of the fourteenth embodiment from the thirteenth embodiment resides in that the range for changing the laser beam power is limited to the proximity of the laser beam power of the OPC result in area-saving OPC F05 in the thirteenth embodiment but in the fourteenth embodiment, the stages of the laser beam power made in ordinary OPC F03 are thinned out and selected. The stage of the laser beam power in the fourteenth embodiment is the same as that of the second embodiment and its explanation will be omitted.

Embodiment 15 will be explained. The difference of the fifteenth embodiment from the thirteenth embodiment resides in that the range for changing the laser beam power is limited to the proximity of the laser beam power of the OPC result in area-saving OPC F05 and the stages of the laser beam power are thinned out and selected in the stage other than the stages in the proximity of the OPC result. The stage of the laser beam power in the fifteenth embodiment is the same as that of the third embodiment and its explanation will be omitted.

Figure 19:
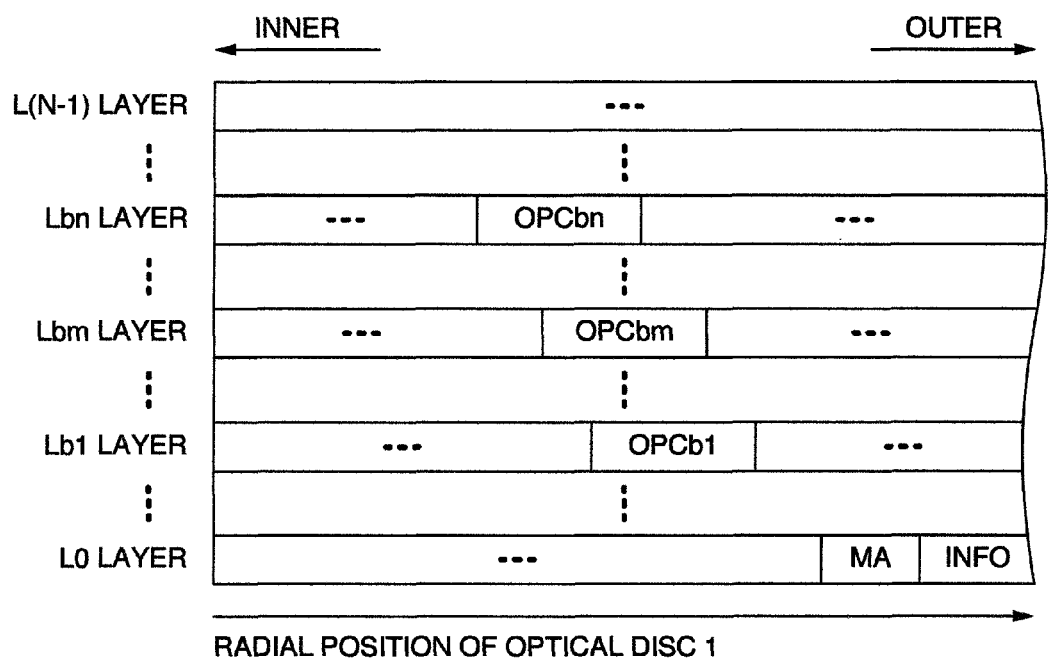
FIG. 19 is an explanatory view showing a construction of an optical disc according to Embodiments 16 to 24 of the invention.

Embodiment 16 will be explained. FIG. 19 shows a structural example of the optical disc 1 in the sixteenth embodiment. The optical disc 1 shown in FIG. 19 has N layers (N: natural number of 2 or more) of recording layers (L0 layer . . . , L(N−1) layer) and each layer has the OPC area. (Not all the layers are shown in the drawing). FIG. 19 shows the case where the OPC area of the Lb1 layer (OPCb1) and n layers of the OPC area of the Lbn layer (OPCbn) overlap partially with each other. Here, n is an integer greater than 0 but not greater than (N−1). The explanation of the MA area and the INFO area will be omitted because they are the same as those of the construction of the three-layered optical disc shown in FIG. 2. The laser beam from the optical pickup 3 is emitted from the L(N−1) layer side to the optical disc 1.

Figure 20:
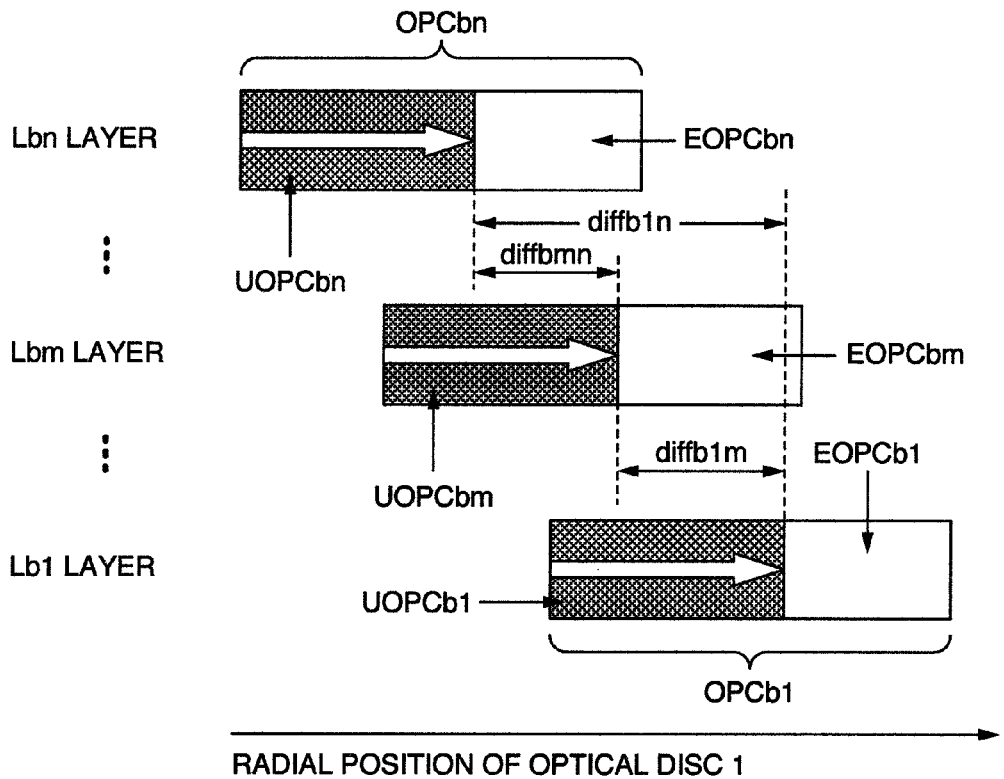
FIG. 20 is an explanatory view showing a utilization concept of an OPC area according to Embodiments 16 to 24 of the invention.

FIG. 20 is a conceptual view of the use state of the OPC area in this embodiment and shows the OPC area of the Lb1 layer (OPCb1), the OPC area of the Lbm layer (OPCbm) and the OPC area of the Lbn layer (OPCan) in FIG. 19. Here, m is an integer of 1 to n. It will be assumed that no OPC area exists which overlaps even partially with the OPCb1 area in the layers on the L0 layer side from OPCb1 when viewed at a radial position. UOPCb1 includes the area (UOPCb1) to which recording is already made to regulate the recording power and the area (EOPCb1) which is not yet recorded. UOPCb1 does not exist when OPC is not made even once in the Lb1 layer. Similarly, the OPC area of the Lbm layer (OPCbm) includes the area (UOPCbm) to which recording is already made to regulate the recording power and the area (EOPCbm) which is not yet recorded. UOPCbm does not exist when OPC is not made even once in the Lbm layer. Similarly, the OPC area of the Lbn layer (OPCbn) includes the area (UOPCbn) to which recording is already made to regulate the recording power and the area (EOPCbn) which is not yet recorded. UOPCbn does not exist when OPC is not made even once in the Lbn layer.

The difference of the OPC processing made in OPCbn in this embodiment from the OPC processing made in OPCd in the tenth embodiment resides in that in the proximity judgment F02 in FIG. 4, the difference of the boundary (diffb1n, etc in FIG. 20) between the recorded area (UOPCb1 to UOPCbn) in the OPC area of each of proximate layers when the OPC area is viewed at a radial position of the optical disc 1 and the non-recorded area (EOPCb1 to EOPCbn) is determined for the OPC area of all the layers overlapping with OPCbn (diffb1$n$ to diffbmn in FIG. 20; m=n−1), ordinary OPC F03 is executed when the result is greater than the threshold value α and readout of OPC result information F04 is made when any of diffb1$n$ to diffbmn (m=n−1) is smaller than the threshold value α. The rest are the same as the OPC processing made in OPCd in the tenth embodiment and the explanation will be therefore omitted.

Next, the case where OPC is executed in the Lbm layer will be explained. In the same way as when OPC is made in the Lbn layer, too, the difference of the distance of the radial position (diffb1$m$, etc in FIG. 20) is calculated from the OPC address information of OPCbm for which OPC is to be made and the OPC address information of the OPC areas of all the layers whose OPC areas overlap with OPCbm and whether ordinary OPC or area-saving OPC F05 is to be made is judged depending on the calculation result. In this way, consumption of the OPCbm area can be suppressed.

Next, the case where OPC is executed in the Lb1 layer will be explained. In the same way as when OPC is made in the Lbn layer, the difference of the distance of the radial position (diffb1$m$, etc in FIG. 20) is calculated from the OPC address information of OPCb1 for which OPC is to be made and the OPC address information of the OPC areas of all the layers whose OPC areas overlap with OPCb1 and whether ordinary OPC or area-saving OPC F05 is to be made is judged depending on the calculation result. In this way, consumption of the OPCb1 area can be suppressed.

Embodiment 17 will be explained. The difference of the seventeenth embodiment from the sixteenth embodiment resides in that the range for changing the laser beam power is limited to the proximity of the laser beam power of the OPC result in area-saving OPC F05 in the sixteenth embodiment but in the seventeenth embodiment, the stages of the laser beam power made in ordinary OPC F03 are thinned out and selected. The stage of the laser beam power in the seventeenth embodiment is the same as that of the second embodiment and its explanation will be omitted.

Embodiment 18 will be explained. The difference of the eighteenth embodiment from the sixteenth embodiment resides in that the range for changing the laser beam power is limited to the proximity of the laser beam power of the OPC result in area-saving OPC F05 and the stages of the laser beam power are thinned out and selected in the stage other than the stages in the proximity of the OPC result. The stage of the laser beam power in the eighteenth embodiment is the same as that of the third embodiment and its explanation will be omitted.

Figure 25:
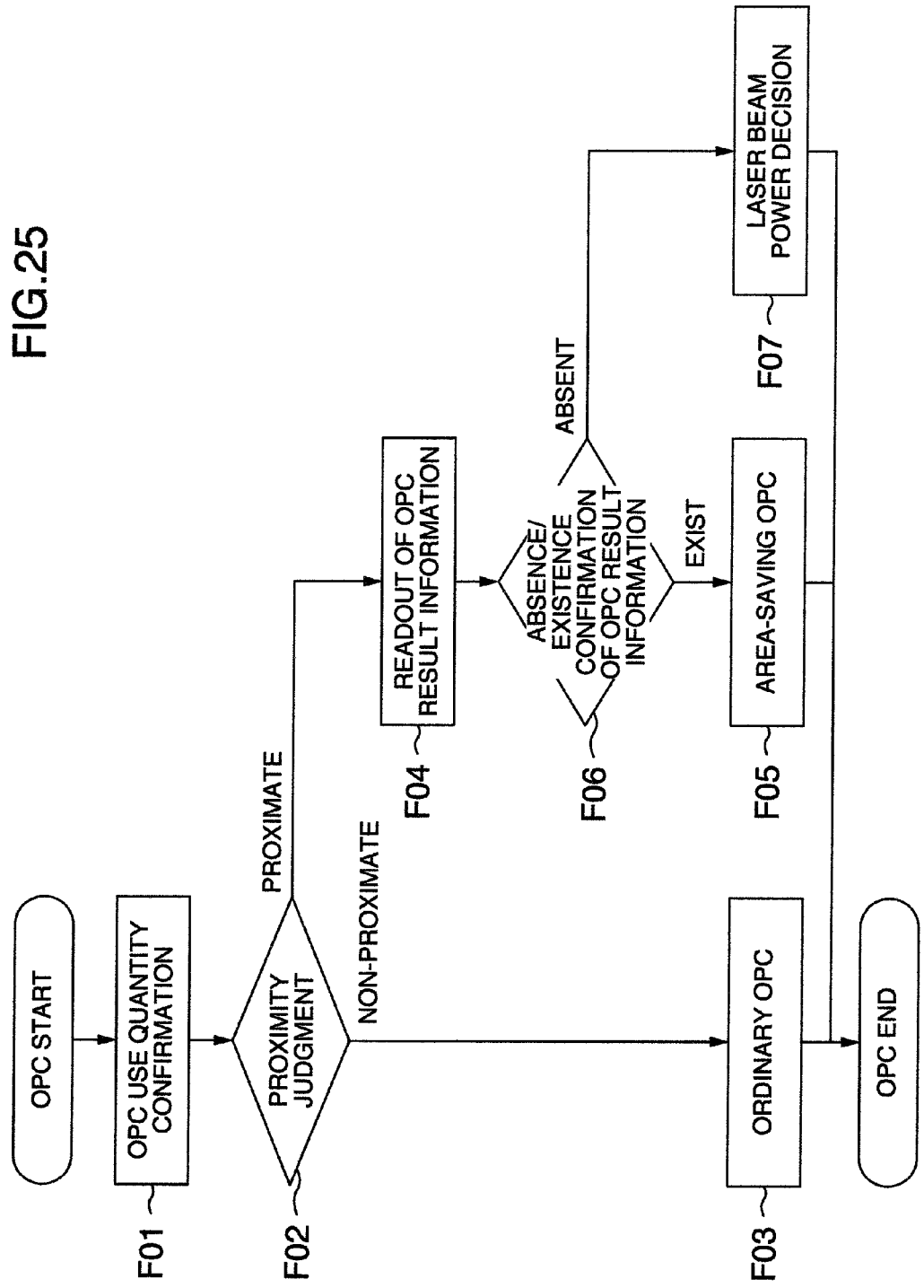
FIG. 25 is a flowchart showing an OPC processing flow according to Embodiment 19 of the invention.

Embodiment 19 will be explained. FIG. 25 shows by flowchart the OPC procedure executed by the software operating on the microcomputer 43 in the nineteenth embodiment. In FIG. 25, the same reference numeral is used to identify the same processing as in the first embodiment shown in FIG. 4. The differences of the nineteenth embodiment from the OPC procedure of the first embodiment shown in FIG. 4 reside in that the existence/absence confirmation of OPC result information F06 is executed after readout of OPC result information F04, that area-saving OPC F05 is executed when the OPC result information is judged as existing by the existence/absence confirmation of OPC result information F06 and that laser beam power decision F07 is made when the OPC result information is judged as being absent by the existence/absence confirmation of OPC result information F06.

Hereinafter, only the differences of the processing of the nineteenth embodiment from the first embodiment will be explained and the explanation of the same processing will be omitted.

In the existence/absence confirmation of OPC result information F06, the microcomputer 43 judges whether or not the OPC result information the manufacturer ID I01, the optical disc apparatus ID I02 and the layer information I03 of which are coincident exists in readout of OPC result information F04. The laser beam power decision F07 is made when the OPC result information turns out to be absent as a result of the judgment and area-saving OPC F05 explained in the first embodiment is made when the OPC result information is judged as existing.

In laser beam power decision F07, laser beam power is decided without executing OPC. The value of laser beam power to be decided is acquired by reading out a recommended laser beam power value recorded in advance by the optical disc manufacturer to the optical disc 1 by reproducing the optical disc 1 and deciding the recommended laser beam power to the optical power. The procedure for reading out the recommended laser beam power is analogous to the procedure of the OPC use quantity confirmation F01 and the explanation will be omitted because only the difference resides in that the area from which the data is read out is different. The recommended laser beam power is recorded to the MA area of the optical disc 1, for example.

Though the difference of this embodiment from the first embodiment has been described, the second to eighteenth embodiments can of course take the same form as this embodiment.

Figure 26:
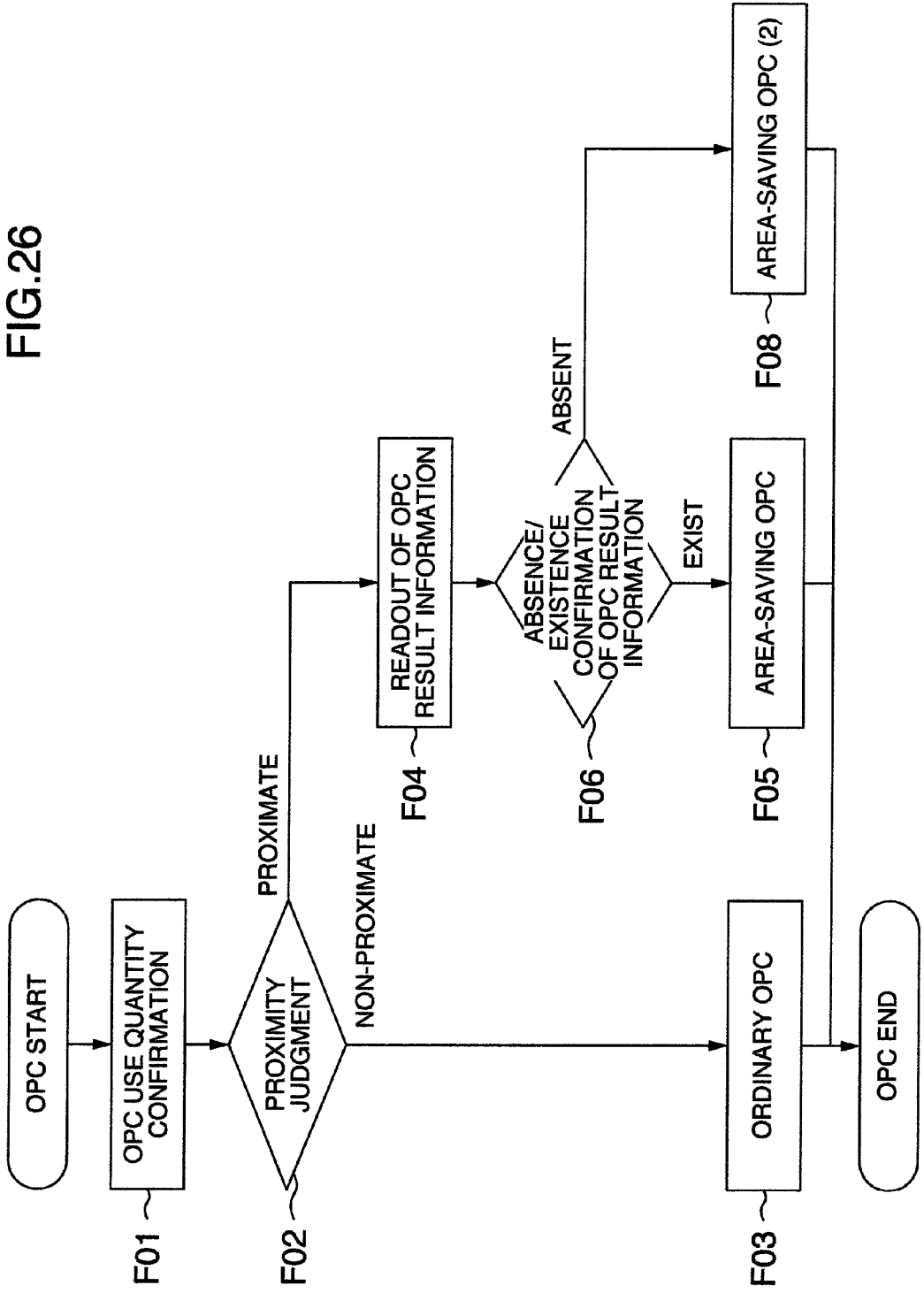
FIG. 26 is a flowchart showing an OPC processing flow according to Embodiments 20 and 21 of the invention.

Embodiment 20 will be explained. FIG. 26 shows by flowchart the OPC procedure executed by the software operating on the microcomputer 43 in the twentieth embodiment. In FIG. 26, the same reference numeral is used to identify the same processing as in the nineteenth embodiment shown in FIG. 25. The difference of the twentieth embodiment from the OPC procedure of the nineteenth embodiment shown in FIG. 25 resides in that area-saving OPC (2) F08 is executed when the OPC result information is judged as absent in the existence/absence confirmation of OPC result information F06.

Hereinafter, the processing of the twentieth embodiment different from that of the nineteenth embodiment will be explained and the explanation of the analogous processing will be omitted.

In area-saving OPC (2) F08, the recommended laser beam power value recorded in advance by the optical disc manufacturer to the optical disc 1 is read out by reproducing the optical disc 1 and the ranges for changing the laser beam power are limited to the proximity of this recommended laser beam power and are narrowed. The procedure for reading out the recommended laser beam power is analogous to the procedure of the OPC use quantity confirmation F01 and the explanation will be omitted because only the difference resides in that the area from which the data is read out is different. The recommended laser beam power is recorded to the MA area of the optical disc 1, for example. The procedure of area-saving OPC (2) F08 is analogous to area-saving OPC F05 and the explanation will be omitted because only the difference is that the range for changing the laser beam power is different.

Though the difference of this embodiment from the first embodiment has been described, the second to eighteenth embodiments can of course take the same form as this embodiment.

Embodiment 21 will be explained. The difference of the twenty-first embodiment from the twentieth embodiment resides in that in area-saving OPC (2) F08, the ranges for changing the laser beam power are limited to the proximity of the recommended laser beam power value and are narrowed in the twentieth embodiment but in the twenty-first embodiment, the ranges are narrowed by thinning out the stages of the laser beam power made in ordinary OPC (2) F08. Because the procedure of area-saving OPC (2) F08 is analogous to that of area-saving OPC F05 explained in the second embodiment, its explanation will be omitted.

Though the difference of this embodiment from the twentieth embodiment has been described, the second to eighteenth embodiments can of course take the same form as this embodiment.

Figure 27:
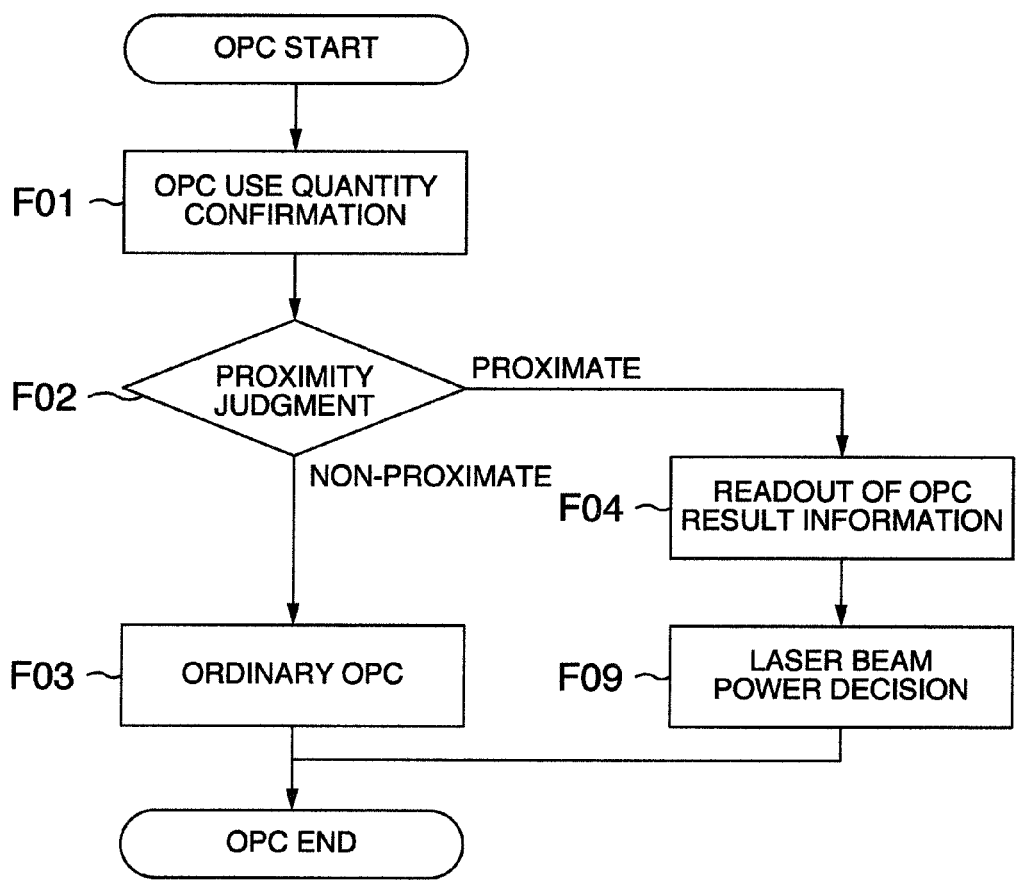
FIG. 27 is a flowchart showing an OPC processing flow according to Embodiment 22 of the invention.

Embodiment 22 will be explained. FIG. 27 shows by flowchart the OPC procedure executed by the software operating on the microcomputer 43 in the twenty-second embodiment. In FIG. 27, the same reference numeral is used to identify the same processing as in the first embodiment shown in FIG. 4. The difference of the twenty-second embodiment from the OPC procedure of the first embodiment shown in FIG. 4 resides in that area-saving OPC F05 is executed after readout of OPC result information F04 in the first embodiment whereas laser beam power decision F09 is executed in this embodiment.

Hereinafter, the processing of the twenty-second embodiment different from that of the first embodiment will be explained and the explanation of the analogous processing will be omitted.

In laser beam power decision F09, the laser beam power is decided without executing OPC. The value of the laser beam power decided is that of the laser beam power as the OPC result read out in readout of OPC result information F04.

Though the difference of this embodiment from the first embodiment has been described, the second to eighteenth embodiments can of course take the same form as this embodiment.

Figures 28, 29:
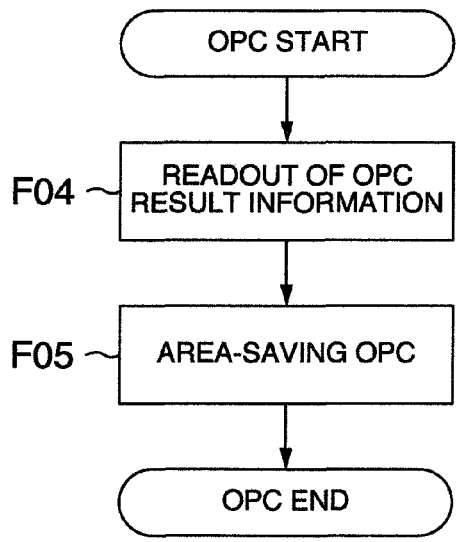
FIG. 28 is an explanatory view schematically showing an example of OPC result information according to Embodiment 23 of the invention.
FIG. 29 is a flowchart showing an OPC processing flow according to Embodiment 24 of the invention.

Embodiment 23 will be explained. FIG. 28 shows another example of the OPC result information to be recorded to the INFO area. The difference from the OPC result information of the first to twenty-second embodiments shown in FIG. 6 is that the OPC result information of this embodiment has an effective range I05. The effective range I05 represents the range of the laser beam power in which the change quantity of the beta value with respect to the change quantity of the laser beam power becomes smaller than the predetermined threshold value. The effective range I05 may well be a laser beam power value as an approximate boundary which becomes smaller than a predetermined threshold value. The OPC use range can be made small by narrowing the laser beam power range to be changed in area-saving OPC F05 and area-saving OPC (2) F08 to the range other than this effective range on the basis of the effective range I05.

Embodiment 24 will be explained. FIG. 29 shows by flowchart the OPC procedure executed by the software operating on the microcomputer 43 in the twenty-fourth embodiment. In FIG. 29, the same reference numeral is used to identify the same processing as in the first embodiment shown in FIG. 4 and the detailed explanation will be omitted. The difference of the twenty-fourth embodiment from the first embodiment shown in FIG. 4 resides in that the degree of proximity of the boundary between the recorded area and the non-recorded area is judged by comparing the diff value calculated by OPC use quantity confirmation F01 in the proximity judgment F02 with the predetermined threshold value a and whether ordinary OPC F03 or readout of OPC result information F04 is to be made is judged in the first embodiment whereas in the twenty-fourth embodiment, readout of OPC result information F04 is executed without executing the proximity judgment F02. In this way, the OPC use area can be further reduced.

Incidentally, in area-saving OPC F05 in the twenty-fourth embodiment, the OPC use area can be decreased by thinning out and selecting the stages of the laser beam power in the same way as in area-saving OPC F05 in the second embodiment. The OPC use area can be reduced, too, by limiting the range in which the laser beam power is changed to the proximity of the OPC result and by thinning out and selecting the stages of the laser beam power other than the proximity as in omission area OPC F05 in the third embodiment.

In the twenty-fourth embodiment, too, even when the OPC result information having coincident manufacturer ID I01, coincident optical disc apparatus ID I02 and coincident layer information I03 does not exist in readout of OPC result information F04 as in the nineteenth to twenty-second embodiments, the present invention can suppress the consumption of the OPC area in the case where large quantities of the OPC area are consumed by an optical disc apparatus manufactured by a different manufacturer or a different optical disc by deciding the laser beam power and the power change range in OPC.

In the twenty-fourth embodiment, too, the OPC use area can be reduced similarly for the four-layered optical disc described in the fourth embodiment as well as for the N-layered optical disc described in the seventh to eighteenth embodiments.

As described above in the first to twenty-third embodiments, the present invention judges the degree of proximity of the non-used area at the radial position of the optical disc 1 from the OPC use quantity of the OPC area of each layer, decreases the number of stages of the laser beam power for changing OPC in accordance with this degree of proximity to reduce the OPC use area, increases the number of times of OPC by suppressing the consumption of the OPC area and can determine the optimum laser beam power. The invention can also determine the optimum laser beam power by executing area-saving OPC without conducting the proximity judgment to increase the number of times of OPC by suppressing the consumption of the OPC area as described in the twenty-fourth embodiment.

As described in the nineteenth to twenty-second embodiments, even when the OPC result information having coincident manufacturer ID I01, coincident optical disc apparatus ID I02 and coincident layer information I03 does not exist in readout of OPC result information F04, the present invention can suppress the consumption of the OPC area and can determine the laser beam power in the case where large quantities of the OPC area are consumed by an optical disc apparatus manufactured by a different manufacturer or a different optical disc by deciding the laser beam power and the power change range in OPC.

Incidentally, the construction shown in FIG. 1 includes the AFE41, the signal quality measurement unit 42, the microcomputer 43, the memory 44, the position control unit 45, the laser beam control unit 46, the motor control unit 47, the digitization unit 48 and the decoding unit 49 as the built-in components in the signal processing LSI4. However, the invention is not particularly limited to this construction and a part or the whole of these components may be provided separately because such a construction may be more advantageous from time to time for easy control and for space requirement of circuit design.

In the description given above, the microcomputer 43 is controlled by the software and executes the data processing and outputs various instructions. However, a part or the whole of these processing may well be made by hardware because such a construction may be more advantageous from time to time for easy control and for space requirement of circuit design.

Figure 21:
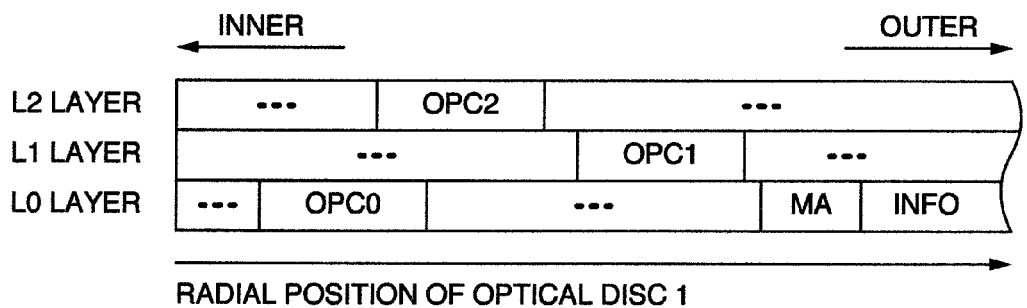
FIG. 21 is an explanatory view showing another construction of an optical disc according to Embodiments 1 to 3 and 19 to 24 of the invention.

In the first to third and twenty-fourth embodiments, the positions of OPC 0 to 2 in the radial direction of the optical disc 1 have the arrangement shown in FIG. 2 but the invention is not particularly limited to this arrangement. For example, the same effect as those of the first to third and twenty-fourth embodiments can be obtained by arranging the OPC 0 to 2 in the arrangement of OPC0, OPC2 and OPC1 from the inner circumferential side at the radial position of the optical disc 1 shown in FIG. 21.

In the first to twenty-fourth embodiments, the address sequence for recording the OPC area in the ascending order within the range recorded once by OPC but the leading address within the recording range by OPC is the descending order. However, recording may be made to the OPC range in the ascending order in the same way as the ordinary data area. In this case, however, the position of the OPC area of each recording layer on the radius of the optical disc 1 is changed in the following way in the first to twenty-third embodiments. Namely, in the first to twenty-third embodiment, the OPC area of the layer on the laser beam emission side from the optical pickup 3 is arranged on the side on which the address value is greater than the OPC area on the L0 layer side but is ranged on the smaller side, on the contrary, in this case.

In ordinary OPC F03 of the first to twenty-third embodiments, signal quality evaluation is made after recording is made for all the laser beam power. However, signal quality evaluation need not always be made after recording is made for all the laser beam power. For example, the evaluation may be made by making recording for the selected laser beam power, reproducing the recorded portion to make signal quality evaluation and then making signal quality evaluation after another recording is made. For, control may become easier by so doing from time to time.

In the first to twenty-fourth embodiments given above, the signal quality measurement unit 42 outputs the measurement result information S06 to the microcomputer 43. However, it is also possible to employ the construction in which the signal quality measurement unit 42 records the measurement result information S06 to the memory 44 and the microcomputer 43 reads out the measurement result information S06 from the memory 44. For, this construction makes control easier from time to time.

In ordinary OPC F03 of the first to twenty-third embodiments given above, the OPC result information is recorded to the INFO area whenever ordinary OPC F03 is executed. However, when the past OPC result information exists in the INFO area which has the coincident manufacturer ID the coincident optical disc ID, the OPC result information need not be recorded afresh and in this case, the use quantity of the INFO area can be reduced.

In area-saving OPC F05 of the first to twenty-fourth embodiments given above, only the selection of the laser beam power is different from ordinary OPC F03 but in this area-saving OPC F05, recording of the OPC result information to the INFO area may be omitted and in this case, the use quantity of the INFO area can be reduced.

In the first to twenty-fourth embodiments given above, the OPC area is provided to each layer of the optical disc 1 but the same result can be obtained even when the OPC area does not exist in any of the layers.

When OPC is executed in the L0 layer of the first to sixth and nineteenth to twenty-third embodiments given above, whether ordinary OPC or area-saving OPC should be made is judged on the basis of the calculation result by calculating the difference (diff in FIG. 3) of the distance of the radial position from the OPC address information of OPC0 for which OPC is now to be made and the OPC address information of OPC2 the radial position of which is proximate. However, because the OPC area OPC0 of the OPC area of the L0 layer is the remotest layer from the optical pickup 3 and because those layers the OPC areas of which are mutually overlapping do not exist at a far position, the influence is small on OPC of other layers even when the diff value is smaller than the threshold value a. Therefore, it is also possible to execute only ordinary OPC as OPC of the L0 layer.

When OPC is executed in the L1 layer of the fourth to sixth and nineteenth to twenty-third embodiments given above, whether ordinary OPC or area-saving OPC should be made is judged on the basis of the calculation result by calculating the difference (diff in FIG. 12) of the distance of the radial position from the OPC address information of OPC1 for which OPC is now to be made and the OPC address information of OPCS the radial position of which is proximate. However, because the OPC area OPC1 of the OPC area of the L1 layer is far and because those layers the OPC areas of which are mutually overlapping do not exist at a far position, the influence is small on OPC of other layers even when the diff value is smaller than the threshold value $\alpha$. Therefore, it is also possible to execute only ordinary OPC as OPC of the L1 layer.

When OPC is executed in the La layer of the seventh to ninth and nineteenth to twenty-third embodiments given above, whether ordinary OPC or area-saving OPC should be made is judged on the basis of the calculation result by calculating the difference (diff in FIG. 3) of the distance of the radial position from the OPC address information of OPCa for which OPC is now to be made and the OPC address information of OPCb the radial position of which is proximate. However, because the OPC area OPCa of the La layer does not have overlapping OPC area at a far position, the influence is small on OPC of other layers even when the diff value is smaller than the threshold value $\alpha$. Therefore, it is also possible to execute only ordinary OPC as OPC of the La layer.

When OPC is executed in the Lc layer of the tenth to twelfth and nineteenth to twenty-third embodiments given above, whether ordinary OPC or area-saving OPC should be made is judged on the basis of the calculation result by calculating the difference (diff in FIG. 16) of the distance of the radial position from the OPC address information of OPCc for which OPC is now to be made and the OPC address information of OPCd the radial position of which is proximate. However, because the OPC area OPCc of the Lc layer does not have overlapping OPC area at a far position, the influence is small on OPC of other layers even when the diff value is smaller than the threshold value $\alpha$. Therefore, it is also possible to execute only ordinary OPC as OPC of the Lc layer.

When OPC is executed in the La1 layer of the thirteenth to fifteenth and nineteenth to twenty-third embodiments given above, whether ordinary OPC or area-saving OPC should be made is judged on the basis of the calculation result by calculating the difference (diffam1, etc in FIG. 18) of the distance of the radial position from the OPC address information of OPCa1 for which OPC is now to be made and the OPC address information of OPCa2 the radial position of which is proximate. However, because the OPC area OPCa1 of the La1 layer does not have overlapping OPC area at a far position, the influence is small on OPC of other layers even when the diffa1*m* value is smaller than the threshold value α. Therefore, it is also possible to execute only ordinary OPC as OPC of the La layer.

When OPC is executed in the Lb1 layer of the sixteenth to eighteenth and nineteenth to twenty-third embodiments given above, whether ordinary OPC or area-saving OPC should be made is judged on the basis of the calculation result by calculating the difference (diffb1*m* in FIG. 3) of the distance of the radial position from the OPC address information of OPCb1 for which OPC is now to be made and the OPC address information of OPCb2 to OPCbn the radial position of which is proximate. However, because the OPC area OPCb1 of the Lb1 layer does not have overlapping OPC area at a far position, the influence is small on OPC of other layers even when the diffb1*m* value is smaller than the threshold value α. Therefore, it is also possible to execute only ordinary OPC as OPC of the Lb1 layer.

Figure 22:
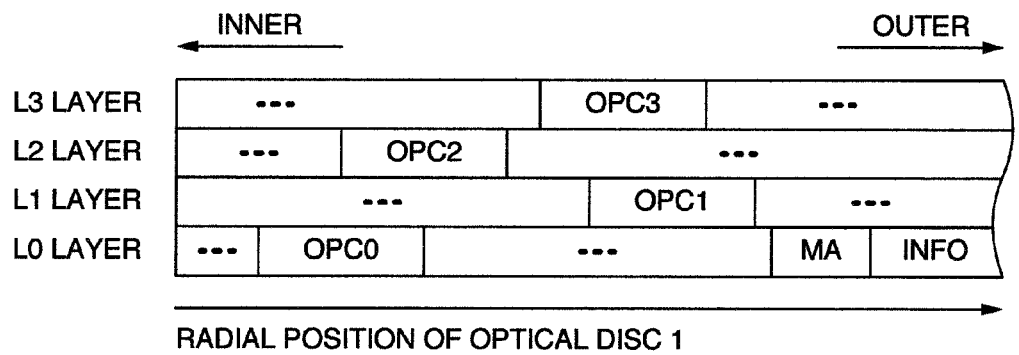
FIG. 22 is an explanatory view showing another construction of an optical disc according to Embodiments 4 to 6 and 19 to 24 of the invention.

In the fourth to sixth and nineteenth to twenty-fourth embodiments given above, the positions of OPC0 to OPC3 in the radial direction have the arrangement shown in FIG. 11 but this arrangement is in no way limitative. For example, even when OPC0 to OPC3 are disposed in the arrangement OPC0, OPC2, OPC3 and OPC1 at the radial positions of the optical disc 1 from the inner circumferential side as shown in FIG. 22, the same effect as those of the fourth to sixth and nineteenth to twenty-fourth embodiment can be obtained.

Figure 23:
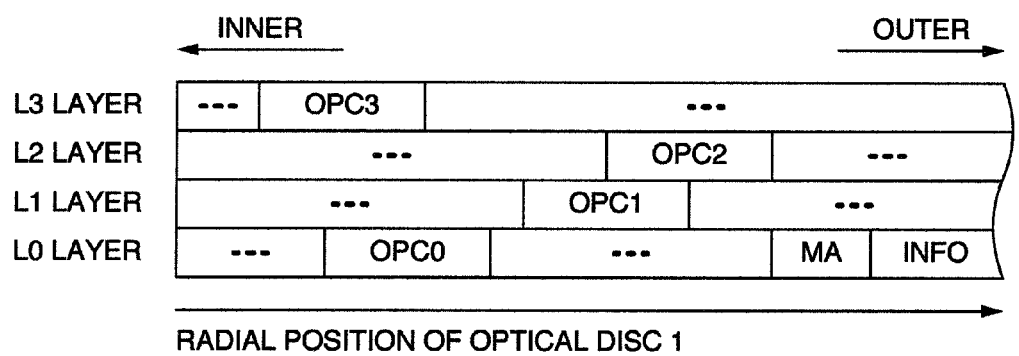
FIG. 23 is an explanatory view showing a construction of an optical disc according to Embodiments 4 to 6 and 19 to 24 of the invention that is different from FIG. 22.

Alternatively, when OPC3, OPC0, OPC1 and OPC2 are arranged as shown in FIG. 23 and OPC2 and OPC0 in the fourth to sixth and nineteenth to twenty-fourth embodiments are replaced by OPC2 and OPC1 in the arrangement shown in FIG. 23 or when OPC3 and OPC1 are replaced by OPC3 and OPC0 in the arrangement shown in FIG. 23, the same effect can be obtained as the fourth to sixth and nineteenth to twenty-fourth embodiments.

Figure 24:
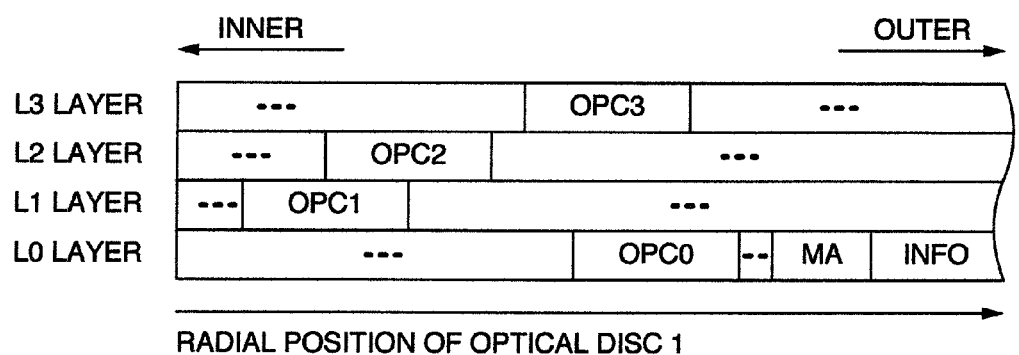
FIG. 24 is an explanatory view showing a construction of an optical disc according to Embodiments 4 to 6 and 19 to 24 of the invention that is different from FIGS. 22 and 23.

Still alternatively, the same effect as the fourth to sixth and nineteenth to twenty-fourth embodiments can be obtained by arranging OPC1, OPC2, OPC3 and OPC0 as shown in FIG. 24.

In the fourth to sixth and nineteenth to twenty-third embodiments given above, the threshold value α for deciding whether ordinary OPC F03 or area-saving OPC F05 should be made is determined in common for both combinations of OPC0 and OPC2 and OPC1 and OPC3 but the threshold values may be different. In this case, suitable threshold values can be set for judgment even when the size of the overlapping area between OPC0 and OPC2 and the overlapping area between OPC1 and OPC3 are different. Consequently, OPC can be executed more effectively.

In FIGS. 2, 11, 13, 15, 17, 19 and 21 to 24, both of the MA area and the INFO area are shown arranged in the L0 layer but they need not always be arranged in the L0 layer but may be arranged in other layers, and, separately from one another.

The invention is not particularly limited to the foregoing embodiments but includes various modified forms. For example, the embodiments given above are explained in detail in order to have the invention more easily understood and the invention is not particularly limited to those which have all the constructions explained above. A part of the construction of certain embodiments can be replaced by the construction of other and the construction of other embodiments can be added to the construction of certain embodiments.

The invention claimed is:

1. A recording apparatus for recording information to a recording medium having a plurality of recording layers, comprising:
a light emission unit configured to irradiate a laser beam to said recording medium; and
a control unit configured to control said light emission unit, said control including execution of an area-saving Optimum Power Calibration (OPC) for said recording medium, said area-saving OPC being conducted in an area smaller than an area used for an ordinary OPC;
wherein, when pre-recorded OPC result information exists on said recording medium and an OPC is executed for said recording medium, said OPC is executed based on data obtained from said pre-recorded OPC result information on said recording medium, said pre-recorded OPC result information including an OPC result coincident with a recording apparatus identifier (ID) of the recording apparatus that performed the OPC.

2. A recording apparatus for recording information to a recording medium having a plurality of recording layers, comprising:
a light emission unit for irradiating a laser beam to said recording medium; and
a control unit for controlling said light emission unit,
wherein, when an Optimum Power Calibration (OPC) is executed for said recording medium, the size of the area used for said OPC is changed on the basis of the distance, in a radial direction, between a starting point of a non-recorded area inside an OPC area of the layer for which OPC is executed and a terminating point of a recorded area inside an OPC area of another layer.

3. A recording apparatus according to claim 2, wherein said OPC is executed as an area-saving OPC when said distance, in the radial direction, is smaller than a predetermined value, and said OPC is made in an area smaller than the area used for ordinary OPC.

4. A recording apparatus according to claim 2, wherein an ordinary OPC is executed when said distance, in the radial direction, increases with the execution of said OPC, even though said distance in the radial direction is smaller than said predetermined value.

5. A recording apparatus according to claim 3, wherein, when said OPC is executed as an area-saving OPC in an area smaller than the area used for ordinary OPC, a power of said laser beam is changed in the proximity of laser power contained in said OPC result information, and the number of instances of change is decreased.

6. A recording apparatus according to claim 3, wherein, when said OPC is executed as an area-saving OPC in an area smaller than the area used for ordinary OPC, an interval of the change of laser power is set to an interval greater than that of an ordinary OPC and the number of instances of change is decreased.

7. A recording apparatus according to claim 3, wherein, when said OPC result information does not exist on said recording medium, a predetermined recommended power value recorded to said recording medium is accessed, and laser power is thereby decided.

8. A method for recording information to a recording medium having a plurality of recording layers, comprising the steps of:
irradiating a laser beam from a light emission unit to said recording medium; and
controlling said light emission unit, said controlling including executing an area-saving Optimum Power Calibration (OPC) for said recording medium, said area-saving OPC being conducted in an area smaller than an area used for an ordinary OPC;
wherein, when pre-recorded OPC result information exists on said recording medium and an OPC is executed for said recording medium, said OPC is executed based on data obtained from said pre-recorded OPC result information on said recording medium, said pre-recorded OPC result information including an OPC result coincident with a recording apparatus identifier (ID) of the recording apparatus that performed the OPC.

9. A method for recording information to a recording medium having a plurality of recording layers, comprising the steps of:
irradiating a laser beam from a light emission unit to said recording medium; and
controlling said light emission unit,
wherein, when an OPC is executed for said recording medium, the size of the area used for said OPC is changed on the basis of the distance, in a radial direction, between a starting point of a non-recorded area inside an OPC area of the layer for which OPC is executed and a terminating point of a recorded area inside an OPC area of another layer.

10. A recording method according to claim 9, wherein said OPC is executed as an area-saving OPC when said distance, in the radial direction, is smaller than a predetermined value and said OPC is made in an area smaller than the area used for ordinary OPC.

11. A recording method according to claim 9, wherein an ordinary OPC is executed when said distance, in the radial direction, increases with the execution of said OPC even when said distance, in the radial direction, is smaller than said predetermined value.

12. A recording method according to claim 10, wherein, when said OPC is executed in an area smaller than the area used for ordinary OPC, power of said laser beam is changed in the proximity of laser power contained in said OPC result information and the number of times of change is decreased.

13. A recording method according to claim 10, wherein, when said OPC is executed as an area-saving OPC in an area smaller than the area used for ordinary OPC, an interval of the change of laser power is set to an interval greater than that of an ordinary OPC, and the number of instances of change is decreased.

14. A recording method according to claim 10, wherein, when said OPC result information does not exist on said recording medium, a predetermined recommended power value recorded to said recording medium is accessed, and said laser power is thereby decided.

15. A recording apparatus according to claim 1, wherein, when said OPC is executed in an area smaller than the area used for an ordinary OPC, a power of said laser beam is changed in the proximity of laser power contained in said OPC result information, and the number of instances of change is decreased.

16. A recording apparatus according to claim 1, wherein, when said OPC is executed in an area smaller than the area used for an ordinary OPC, an interval of the change of laser power is set to an interval greater than that of an ordinary OPC and the number of instances of change is decreased.

17. A recording apparatus according to claim 1, wherein, when said OPC result information does not exist on said recording medium, a predetermined recommended power value recorded to said recording medium is accessed, and said laser power is thereby decided.

18. A recording method according to claim 8, wherein, a power of said laser beam is changed in the proximity of laser power contained in said OPC result information, and the number of instances of change is decreased.

19. A recording method according to claim 8, wherein, an interval of the change of laser power is set to an interval greater than that of an ordinary OPC and the number of instances of change is decreased.

20. A recording method according to claim 8, wherein, when said OPC result information does not exist on said recording medium, a predetermined recommended power value recorded to said recording medium is accessed, and laser power is thereby decided.

21. A reproducing apparatus, configured to:
record information onto a recording medium having a plurality of recording layers, each layer having an Optimum Power Calibration (OPC) area; and
control a size of an OPC area of a layer to which an OPC is conducted, at the time of recording onto said recording medium, so as to be related to a distance, in a radial direction, from an unrecorded area within said OPC area at one end to a recorded area within an OPC area of another layer at another end.

* * * * *

UNITED STATES PATENT AND TRADEMARK OFFICE
CERTIFICATE OF CORRECTION

PATENT NO. : 8,203,921 B2
APPLICATION NO. : 12/832182
DATED : June 19, 2012
INVENTOR(S) : Y. Mutsuro et al.

Page 1 of 1

It is certified that error appears in the above-identified patent and that said Letters Patent is hereby corrected as shown below:

On the Title Page, between Item (65) and Item (51) please insert:

Item --(30) Foreign Application Priority Data

December 28, 2009    (JP)................2009-296676--.

Signed and Sealed this
Twenty-first Day of August, 2012

David J. Kappos
*Director of the United States Patent and Trademark Office*